US 11,749,981 B2

(12) United States Patent
Shinohara

(10) Patent No.: US 11,749,981 B2
(45) Date of Patent: Sep. 5, 2023

(54) CONTROL DEVICE FOR AC ROTATING MACHINE, ELECTRIC BRAKING DEVICE FOR VEHICLE, AND CONTROL METHOD FOR AC ROTATING MACHINE

(71) Applicant: Mitsubishi Electric Corporation, Tokyo (JP)

(72) Inventor: Ryo Shinohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 53 days.

(21) Appl. No.: 17/485,721

(22) Filed: Sep. 27, 2021

(65) Prior Publication Data

US 2022/0158441 A1 May 19, 2022

(30) Foreign Application Priority Data

Nov. 13, 2020 (JP) ................. 2020-189091

(51) Int. Cl.
*H02H 7/08* (2006.01)
*H02H 1/00* (2006.01)
*H02P 27/06* (2006.01)

(52) U.S. Cl.
CPC ........ *H02H 7/0822* (2013.01); *H02H 1/0007* (2013.01); *H02P 27/06* (2013.01)

(58) Field of Classification Search
CPC ..... H02H 7/0822; H02H 1/0007; H02P 27/06
See application file for complete search history.

(56) References Cited

U.S. PATENT DOCUMENTS

| 2014/0368150 | A1 | 12/2014 | Furukawa et al. | |
| 2018/0175779 | A1* | 6/2018 | Koseki | .............. H02H 7/08 |
| 2018/0194334 | A1* | 7/2018 | Masuda | .............. B60T 13/74 |

FOREIGN PATENT DOCUMENTS

| JP | 2015-202019 A | 11/2015 |
| JP | 2016-214037 A | 12/2016 |
| JP | 2017-052420 A | 3/2017 |
| WO | 2013/125057 A1 | 8/2013 |

OTHER PUBLICATIONS

Notice of reasons for refusal dated Dec. 7, 2021 from the Japanese Patent Office in JP Application No. 2020-189091.

* cited by examiner

*Primary Examiner* — Zoheb S Imtiaz
(74) *Attorney, Agent, or Firm* — Sughrue Mion, PLLC; Richard C. Turner

(57) ABSTRACT

A control device for an AC rotating machine includes: switching control means for controlling inverters and motor relays 15; and abnormality detection means for detecting an abnormality in each system and outputting a result of the detection to the switching control means. When the abnormality detection means detects an abnormality in at least one of the systems, the switching control means causes the motor relay to block a circuit between windings and the inverter in the system in which the abnormality has been detected, and continues normal control in a system other than the system in which the abnormality has been detected.

18 Claims, 8 Drawing Sheets

CONTROL DEVICE FOR AC ROTATING MACHINE, ELECTRIC BRAKING DEVICE FOR VEHICLE, AND CONTROL METHOD FOR AC ROTATING MACHINE

BACKGROUND OF THE INVENTION

1. Field of the Invention

The present disclosure relates to a control device for an AC rotating machine, an electric braking device for a vehicle, and a control method for an AC rotating machine.

2. Description of the Background Art

In the case where a control device for an AC rotating machine is used for an electric braking device for a vehicle, it has been conventionally proposed to improve reliability by making it possible to continuously drive the AC rotating machine while avoiding an abnormality that has occurred at a specific location. Here, the "electric braking device for a vehicle" refers to a device that presses a friction member against a rotating member, which is fixed to a wheel of a vehicle, via an AC rotating machine to generate braking torque on the wheel, and requires high reliability. A control device for an AC rotating machine disclosed in Patent Document 1 is configured such that, when an abnormality such as a short-circuit failure or an open-circuit failure of a switching element of an inverter is detected in an AC rotating machine that is provided with a plurality of systems each including windings and an inverter for applying voltages to the windings, switching elements on the same potential side of respective phases in the inverter of the system in which the abnormality has occurred are set to be in the same state as a failure, and ON/OFF control of switching elements in the inverter of a normal system in which the abnormality has not occurred is continued. In the control device for an AC rotating machine disclosed in Patent Document 1, owing to the above configuration, brake torque is made constant regardless of a rotation angle, thereby suppressing torque pulsation.

Patent Document 1: International Publication No. WO2013/125057

In the control device for an AC rotating machine disclosed in Patent Document 1, however, due to the configuration in which the switching elements on the same potential side of the respective phases in the inverter of the system in which the abnormality has occurred are set to be in the same state as a failure while drive of the AC rotating machine is continued by the normal system in which the abnormality has not occurred, no measures are taken for a reflux current flowing through a current path formed between the windings and the inverter of the AC rotating machine, so that motor brake torque generated by the reflux current may interfere with the control by the normal system.

SUMMARY OF THE INVENTION

The present disclosure has been made to solve the above problem, and an object of the present disclosure is to obtain a control device for an AC rotating machine, an electric braking device for a vehicle, and a control method for an AC rotating machine which can prevent an abnormality occurring in a system from interfering with control by a normal system in a control device for controlling an AC rotating machine provided with a plurality of systems.

A control device for an AC rotating machine according to the present disclosure is a control device for an AC rotating machine, for controlling an AC rotating machine including windings of a plurality of systems, the control device including: a plurality of inverters for controlling voltages to be applied to the windings of the systems, respectively; a plurality of switching means for switching between connection and blocking of a circuit between the windings and the inverter in each of the systems; control means for controlling the plurality of inverters and the plurality of switching means; and abnormality detection means for detecting an abnormality in each of the systems and outputting a result of the detection to the control means, wherein, when the abnormality detection means detects an abnormality in at least one of the systems, the control means causes the switching means to block the circuit between the windings and the inverter in the system in which the abnormality has been detected, and continues normal control in a system other than the system in which the abnormality has been detected.

A control method for an AC rotating machine according to the present disclosure is a control method for an AC rotating machine including windings of a plurality of systems, the control method including the steps of: detecting an abnormality in each system; and, if an abnormality is detected in at least one of the systems, blocking a circuit between the windings and an inverter for controlling voltages to be applied to the windings, in the system in which the abnormality has been detected, and continuing normal control in a system other than the system in which the abnormality has been detected.

With the control device for an AC rotating machine, the electric braking device for a vehicle, and the control method for an AC rotating machine according to the present disclosure, it is possible to prevent an abnormality occurring in a system from interfering with control by a normal system in a control device for controlling an AC rotating machine provided with a plurality of systems.

DETAILED DESCRIPTION OF THE PREFERRED EMBODIMENTS OF THE INVENTION

Figure 1:
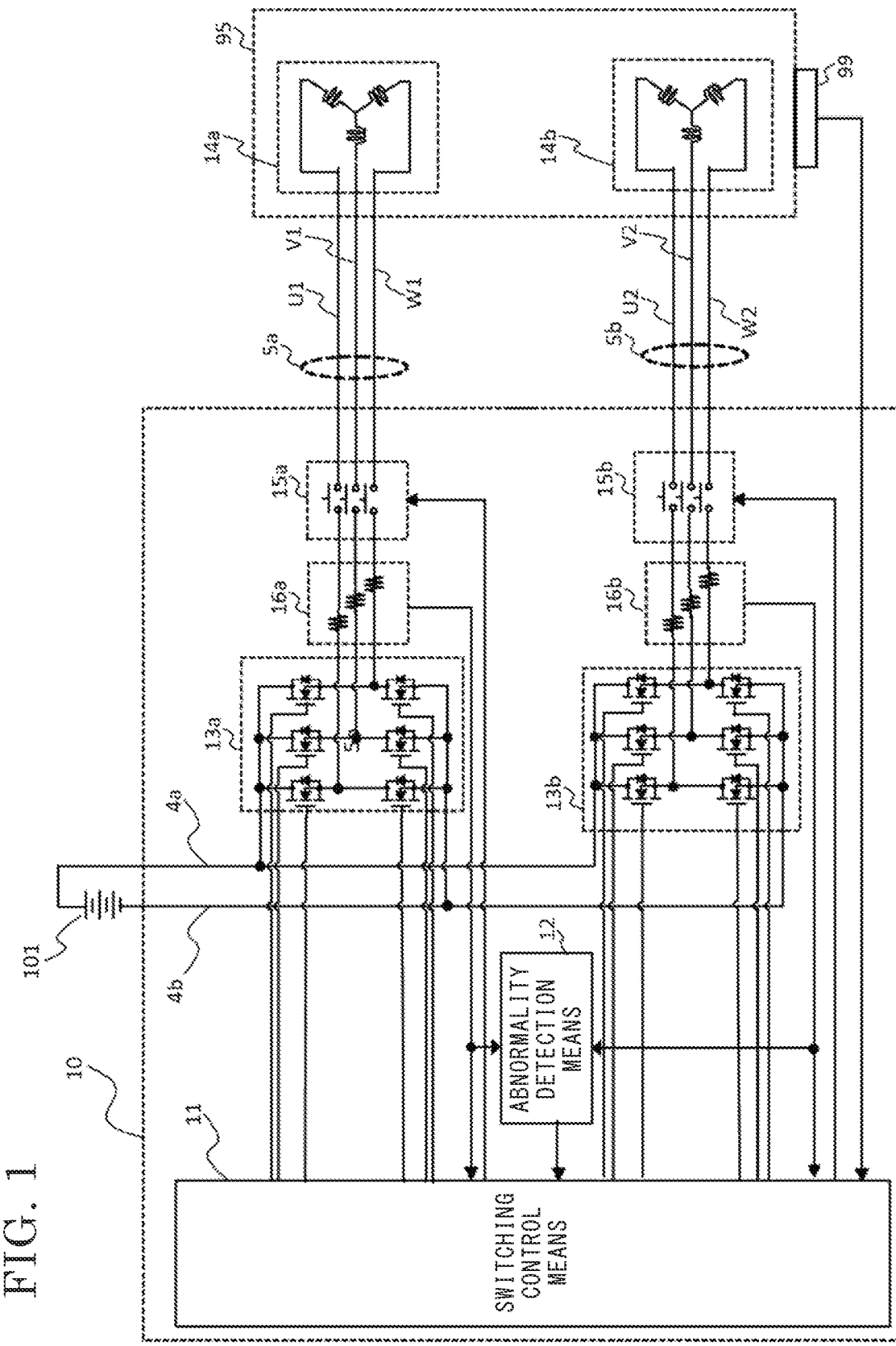
FIG. 1 is a schematic configuration diagram showing a control device for an AC rotating machine according to a first embodiment.

Hereinafter, the control device for an AC rotating machine, the electric braking device for a vehicle, and the control method for an AC rotating machine according to the present disclosure will be described with reference to the drawings. In each embodiment, the same or corresponding parts are designated by the same reference characters, and the description thereof is omitted.

First Embodiment

A first embodiment will be described with reference to FIG. 1 to FIG. 3. FIG. 1 is a schematic configuration diagram showing a control device for an AC rotating machine according to the first embodiment. A control device 10 for an AC rotating machine is connected to a power supply 101 by DC buses 4a and 4b, and exchanges regenerative power and drive power with the power supply 101. In addition, the control device 10 for an AC rotating machine is connected to an AC rotating machine 95 by AC buses 5a and 5b, and exchanges regenerative power and drive power with the AC rotating machine 95. As shown in FIG. 1, the AC rotating machine 95 includes: a first winding system 14a including three phases, U1, V1, and W1 phases; and a second winding system 14b including three phases, U2, V2, and W2 phases, and respective windings of the phases are connected by star connection. In FIG. 1, wires through which currents of the respective phase flow are a wire U1, a wire V1, . . . a wire W2. A stator (not shown) includes these winding systems, and the AC rotating machine 95 includes the stator, a rotor (not shown), and a rotation shaft fixed to the rotor. In the first embodiment, a description will be given with the case of application to a permanent magnet synchronous AC rotating machine in which each winding system includes three phases and permanent magnets are disposed at a rotor, as an example. However, the first embodiment can be used for an AC rotating machine that is rotationally driven by multi-phase alternating currents of three or more phases, and may be applied to an induction machine or a field winding type synchronous machine. Although the windings are connected by star connection in this example, the same effects are obtained even when the windings are connected by delta connection. In addition, the AC rotating machine 95 includes a rotation angle sensor 99 for detecting a rotation angle of the AC rotating machine 95.

The control device 10 for an AC rotating machine includes an inverter 13a of a first system, an inverter 13b of a second system, a motor relay 15a connected between the first winding system 14a and the inverter 13a of the first system, a motor relay 15b connected between the second winding system 14b and the inverter 13b of the second system, motor current detection means 16a and 16b for detecting values of currents of the AC rotating machine 95 which flow through the AC buses 5a and 5b, switching control means 11 for generating drive commands to switching elements of the inverters 13a and 13b, and abnormality detection means 12 for detecting abnormalities in the control device 10 for an AC rotating machine and the AC rotating machine 95. Each of the motor relays 15a and 15b may be of either a thermal type or a transistor type.

The rotation angle sensor 99 detects a rotor rotation angle of the AC rotating machine 95 by a resolver, an encoder, or the like. The detected rotor rotation angle is outputted as rotation angle information to the switching control means 11.

The inverter 13a of the first system and the inverter 13b of the second system are each a commonly known inverter in which six switching elements are connected in a full-bridge configuration. That is, as shown in FIG. 1, switching elements for U phase are connected in series to each other, switching elements for V phase are connected in series to each other, switching elements for W phase are connected in series to each other, and these switching elements are connected in parallel to the power supply 101. In addition, a middle point between the switching elements for each phase is connected to the corresponding phase of the AC rotating machine 95.

Here, a switching element connected to the positive electrode side of the power supply 101 (DC bus 4a) is referred to as a high-side switching element, and a switching element connected to the negative electrode side of the power supply 101 (DC bus 4b) is referred to as a low-side switching element.

It should be noted that a freewheel diode (FWD) is provided in parallel to each switching element such that the direction from the negative electrode side toward the positive electrode side of the DC power supply (direction from the low side toward the high side) is a forward direction.

As each switching element, for example, a metal oxide semiconductor field effect transistor (MOSFET) shown in FIG. 1 is used, or, other than the MOSFET, an insulated gate bipolar transistor (IGBT) or the like is used.

When the motor current detection means 16a and 16b detect values of currents of the AC rotating machine 95 which flow through the AC buses 5a and 5b, the motor current detection means 16a and 16b convert the detected values of the currents to voltages and output the voltages as phase current information to the switching control means 11 and the abnormality detection means 12. In the first embodiment, an example is shown in which each of the motor current detection means 16a and 16b is configured by connecting a shunt resistor to the wire of each phase and detects a current value of a current flowing through the wire of each phase. However, instead of the shunt resistor, a current sensor using a Hall element or the like may be used. In addition, in the first embodiment, the shunt resistors are connected to the wires of all the phases to detect a current value of each phase, but if two phase currents are known for each winding system, the remaining phase current can be obtained, and thus shunt resistors may be provided in any two of the U1 phase (U2 phase), the V1 phase (V2 phase), and the W1 phase (W2 phase) to form the motor current detection means 16a (16b). In the case where shunt resistors are provided in all the phases, six shunt resistors are required in total, but if shunt resistors are provided in only any two phases of each system, the number of required shunt resistors is four in total. Moreover, in the first embodiment, the motor current detection means 16a and 16b are provided on the AC buses 5a and 5b, but the locations where the motor current detection means 16a and 16b are provided are not limited thereto as long as the locations are locations where a phase current of each phase can be detected. For example, the motor current detection means 16a and 16b may be provided between the low-side switching elements and the negative electrode side of the power supply 101 (DC bus 4b).

The switching control means 11 performs overall control of the control device 10 for an AC rotating machine, and includes a microcontroller (not shown) and a gate drive circuit for driving each switching element of the inverters 13a and 13b. In general, on the basis of the phase current information inputted from the motor current detection means 16a and 16b and the rotation angle information inputted from the rotation angle sensor 99, the switching control means 11 in the control device 10 for an AC rotating machine controls the currents of the windings of the AC rotating machine 95 with a phase current, at which the rotation speed or output torque of the AC rotating machine 95 becomes a desired value, as a target value. The switching control means 11 calculates an ON/OFF drive command for each switching element of the inverters 13a and 13b, and outputs a drive command signal to each switching element through the gate drive circuit. The switching control means 11 also outputs ON/OFF drive command signals for the motor relays 15a and 15b. As for a control method for the AC rotating machine 95 in a normal state, a generally known technique is employed, and the detailed description thereof is omitted.

The abnormality detection means 12 detects an abnormality in each system. In the abnormality detection means 12, for example, a test pattern indicating a predetermined combination for turning on the switching elements of each of the inverter 13a of the first system and the inverter 13b of the second system is stored in a memory (not shown in FIG. 1) in advance. On the basis of the comparison between the current value of each phase detected by the motor current detection means 16a and 16b as a response to the test pattern and the test pattern, the abnormality detection means 12 detects a short-circuit failure and an open-circuit failure of a switching element. The abnormality detection means 12 outputs information indicating the presence/absence of an abnormality, to the switching control means 11.

In the first embodiment, as described above, an abnormality is detected on the basis of the values of the currents flowing through the windings, but the method for detecting an abnormality in each system is not limited to the above. For example, a method for detecting an abnormality in a current sensor itself which is motor current detection means (detecting a deviation of an output voltage of the current sensor from the specification range thereof, or the like), a method for detecting an abnormality by an IC mounted on the gate drive circuit, and a method for detecting an abnormality on the basis of overvoltage or undervoltage of an input voltage to the inverter or the like are also conceivable.

The technical feature of the control device 10 for an AC rotating machine according to the first embodiment is that the control device 10 includes inverters of a plurality of systems corresponding to windings of a plurality of systems and motor relays connected between the inverters and the AC rotating machine, and that, when an abnormality in at least one system is detected by the abnormality detection means, the motor relay for the inverter of the system in which the abnormality has been detected is turned off, and normal control is continued in the inverter of a normal system other than the system in which the abnormality has been detected.

Figure 2:
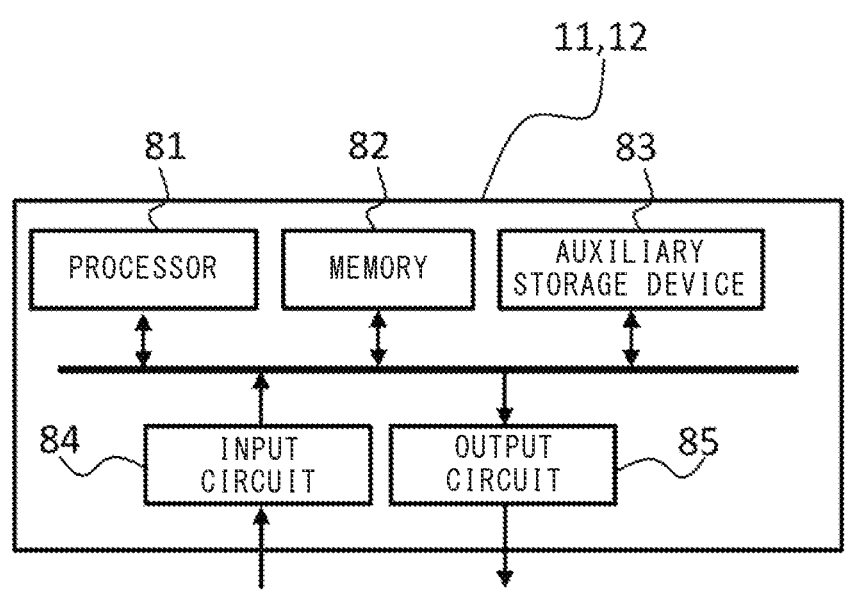
FIG. 2 is a diagram showing an example of the hardware configuration of switching control means and abnormality detection means according to the first embodiment.
Figure 3:
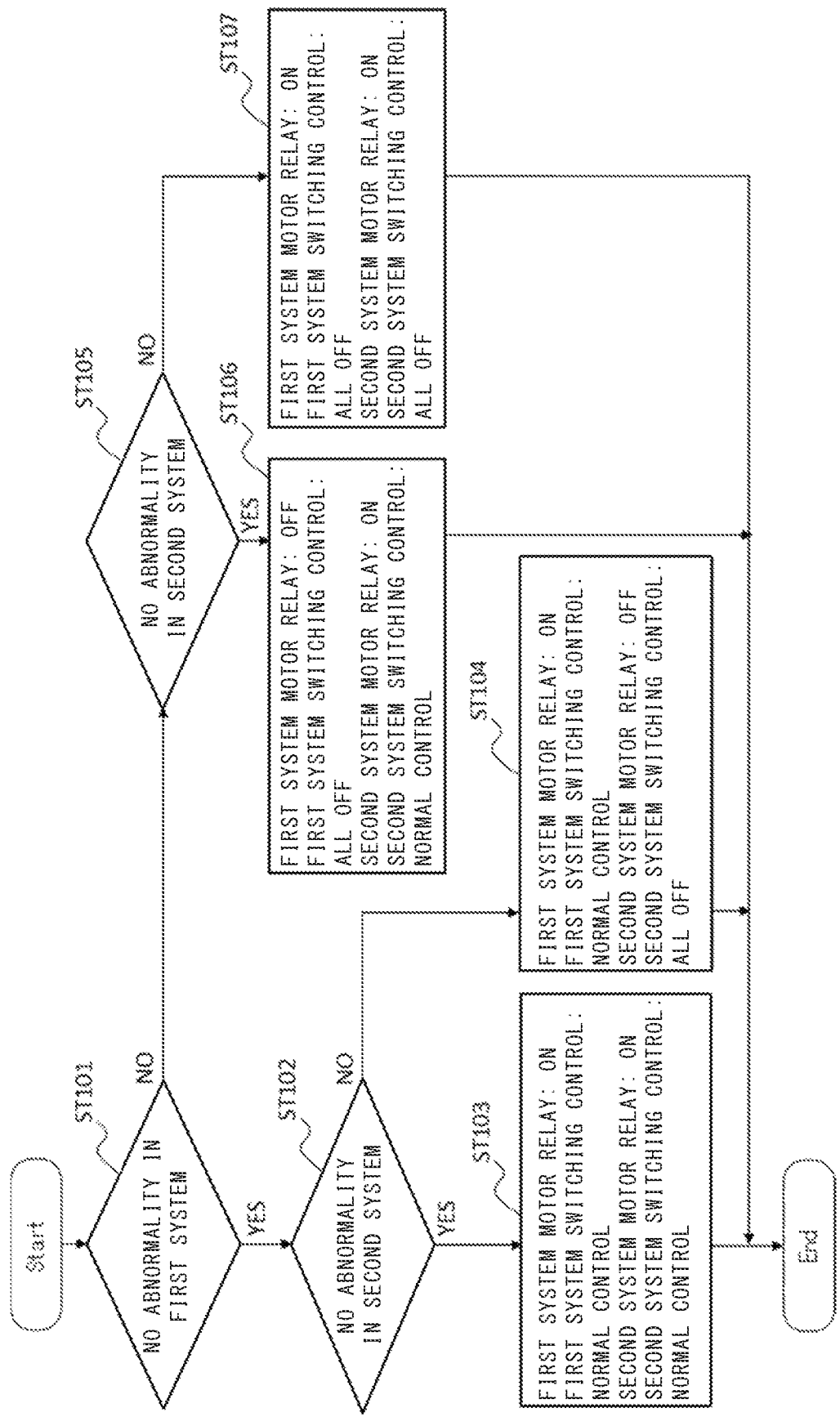
FIG. 3 is a flowchart showing operation of the control device for an AC rotating machine according to the first embodiment.

Each of the switching control means 11 and the abnormality detection means 12 is realized by, for example, a hardware configuration shown in FIG. 2. Each of the switching control means 11 and the abnormality detection means 12 mainly includes a processor 81, a memory 82 as a main storage device, and an auxiliary storage device 83. The processor 81 is composed of, for example, a CPU, an application specific integrated circuit (ASIC), a digital signal processor (DSP), a field programmable gate array (FPGA), and the like. The memory 82 is composed of a volatile storage device such as a random access memory, and the auxiliary storage device 83 is composed of a non-volatile storage device such as a flash memory, a hard disk, or the like. A predetermined program to be executed by the processor 81 is stored in the auxiliary storage device 83, and the processor 81 reads and executes this program as appropriate to perform various calculation processes. At this time, the above predetermined program is temporarily stored in the memory 82 from the auxiliary storage device 83, and the processor 81 reads the program from the memory 82. The processes by the switching control means 11 and the abnormality detection means 12 are realized by the processor 81 executing the predetermined program as described above.

Each of the switching control means 11 and the abnormality detection means 12 further includes an input circuit 84 which receives an input of data or the like from outside, and an output circuit 85 which outputs a drive command signal or the like to outside.

Next, operation will be described. FIG. 3 is a flowchart showing operation of the control device for an AC rotating machine according to the first embodiment. The process shown in the flowchart of FIG. 3 is described as a process of one sequence to be executed by software. In reality, the process shown in FIG. 3 is periodically and repeatedly executed according to the calculation cycle of the software.

First, whether there is no abnormality in the first system, that is, whether there is no abnormality, for example, in the inverter 13a of the first system, is determined on the basis of the detection result of the abnormality detection means 12 (step ST101). If there is no abnormality in the first system (step ST101: YES), the process shifts to step ST102, and whether there is no abnormality in the second system, that is, whether there is no abnormality, for example, in the inverter 13b of the second system, is determined on the basis of the detection result of the abnormality detection means 12 (step ST102). If there is no abnormality in the second system (step ST102: YES), the process shifts to step ST103. If there is an abnormality in the second system (step ST102: NO), the process shifts to step ST104.

When the process shifts to step ST103, since there is no abnormality in each of the inverter 13a of the first system and the inverter 13b of the second system, and there is no abnormality in each of the first system and the second system, the first system and the second system continue normal control. The switching control means 11 outputs an ON drive command to the motor relay 15a of the first system and the motor relay 15b of the second system, and also outputs a switching drive command calculated as usual on the basis of the phase current information and the rotation angle information, to each switching element of the inverter 13a of the first system and each switching element of the inverter 13b of the second system.

When the process shifts to step ST104, there is no abnormality in the inverter 13a of the first system, and there is no abnormality in the first system. On the other hand, there is an abnormality in the inverter 13b of the second system, and there is an abnormality in the second system. In such a case, whereas the first system continues normal control, the second system is stopped such that brake torque is not generated. The switching control means 11 outputs an ON drive command to the motor relay 15a of the first system, and also outputs a switching drive command calculated as usual on the basis of the phase current information and the rotation angle information, to each switching element of the inverter 13a of the first system. In addition, the switching control means 11 outputs an OFF drive command to the motor relay 15b of the second system, and also outputs a switching drive command to each switching element of the inverter 13*b* of the second system such that all the switching elements are turned off. As a result of the process in step ST104, the motor relay 15*b* of the second system in which the abnormality has been detected is turned off, so that a current path of a current generated by regenerative power generation of the AC rotating machine 95 and a path of a reflux current formed between the inverter 13*b* and the second winding system 14*b* are blocked in the second system. Therefore, even when control is continued by the first system and the AC rotating machine 95 rotates, generation of regenerative brake torque by regenerative power generation and generation of brake torque by a reflux current flowing through the current path formed between the inverter and the windings of the AC rotating machine 95 can be prevented in the second system, so that drive of the AC rotating machine 95 by the first system can be stably continued.

If, in step ST101, there is an abnormality in the first system (step ST101: NO), the process shifts to step ST105, and whether there is no abnormality in the second system, that is, whether there is no abnormality, for example, in the inverter 13*b* of the second system, is determined on the basis of the detection result of the abnormality detection means 12 (step ST105). If there is no abnormality in the second system in (step ST105: YES), the process shifts to step ST106. If there is an abnormality in the second system (step ST105: NO), the process shifts to step ST107.

When the process shifts to step ST106, there is no abnormality in the inverter 13*b* of the second system, and there is no abnormality in the second system. On the other hand, there is an abnormality in the inverter 13*a* of the first system, and there is an abnormality in the first system. In such a case, whereas the second system continues normal control, the first system is stopped such that brake torque is not generated. The switching control means 11 outputs an ON drive command to the motor relay 15*b* of the second system, and also outputs a switching drive command calculated as usual on the basis of the phase current information and the rotation angle information, to each switching element of the inverter 13*b* of the second system. In addition, the switching control means 11 outputs an OFF drive command to the motor relay 15*a* of the first system, and also outputs a switching drive command to each switching element of the inverter 13*a* of the first system such that all the switching elements are turned off. As a result of the process in step ST106, the motor relay 15*a* of the first system in which the abnormality has been detected is turned off, so that a current path of a current generated by regenerative power generation of the AC rotating machine 95 and a path of a reflux current formed between the inverter 13*a* and the first winding system 14*a* are blocked in the first system. Therefore, even when control is continued by the second system and the AC rotating machine 95 rotates, generation of regenerative brake torque by regenerative power generation and generation of brake torque by a reflux current flowing through the current path formed between the inverter and the windings of the AC rotating machine can be prevented in the first system, so that drive of the AC rotating machine by the second system can be stably continued.

When the process shifts to step ST107, since there is an abnormality in each of the inverter 13*a* of the first system and the inverter 13*b* of the second system, and there is an abnormality in each of the first system and the second system, both the first system and the second system stop control of the AC rotating machine 95. The switching control means 11 outputs an ON drive command to the motor relay 15*a* of the first system and the motor relay 15*b* of the second system, and also outputs a switching drive command to each switching element of the inverter 13*a* of the first system and the inverter 13*b* of the second system such that all the switching elements are turned off.

The reason why the operation of outputting an ON drive command to the motor relay 15*a* of the first system and the motor relay 15*b* of the second system is performed in step ST107 is to ensure a current path of a current generated by regenerative power generation of the AC rotating machine 95. Owing to the presence of the current path, a current generated by regenerative power generation flows to the power supply 101. Thus, even if the AC rotating machine 95 rotates at a high speed when it is determined that there is an abnormality in each of the first system and the second system, the time taken until the rotation of the AC rotating machine 95 stops can be shortened by regenerative brake torque generated by regenerative power generation. On the other hand, in a system in which it is not necessary to immediately stop rotation of the AC rotating machine 95, an operation of outputting an OFF drive command to the motor relay 15*a* of the first system and the motor relay 15*b* of the second system may be performed.

In step ST104, the operation of outputting an OFF drive command to the motor relay 15*b* of the second system and outputting a switching drive command to each switching element of the inverter 13*b* of the second system such that all the switching elements are turned off, is performed. However, the main purpose of the operation in step ST104 is to output an OFF drive command to the motor relay 15*b* of the second system, and it is not always necessary to turn off all the switching elements of the inverter 13*b* of the second system. Thus, for example, an operation of outputting a drive command for turning on either the high-side switching elements or the low-side switching elements as a command to each switching element of the inverter 13*b* of the second system may be performed. Even in this case, the motor relay 15*b* is similarly turned off, so that a reflux current does not flow between the inverter 13*b* and the second winding system 14*b*, and the same effects as those in the case where all the switching elements of the inverter 13*b* are turned off can be obtained.

Also, as for the process in step ST106, that is, the operation of outputting an OFF drive command to the motor relay 15*a* of the first system and outputting a switching drive command to the inverter 13*a* of the first system such that all the switching elements are turned off, the description is the same as the above description for step ST104, it is not always necessary to turn off all the switching elements of the inverter 13*a* of the first system, and it is sufficient if the high-side switching elements and the low-side switching elements are not turned on at the same time. Therefore, for example, an operation of outputting a drive command for turning on either the high-side switching elements or the low-side switching elements as a command to the inverter 13*a* of the first system may be performed. Even in this case, the motor relay 15*a* is similarly turned off, so that a reflux current does not flow between the inverter 13*a* and the first winding system 14*a*, and the same effects as those in the case where all the switching elements of the inverter 13*a* are turned off can be obtained.

In the first embodiment, the motor relays are used, but any switching means for switching between connection and blocking between the windings of the AC power generator and the inverters may be used, since it is sufficient if formation of a current path through which a reflux current flows can be prevented from being formed between the windings of the AC power generator and each inverter.

As described above, in the first embodiment, the control device for an AC rotating machine which controls an AC rotating machine including windings of a plurality of systems has a configuration in which, when an abnormality is detected in at least the inverter of one system, a motor relay for the inverter of the system in which the abnormality has been detected is turned off, and normal control is continued in the inverter of a normal system other than the system in which the abnormality has been detected.

Owing to this configuration, in the system in which the abnormality has been detected, a path of a current generated by regenerative power generation of the AC rotating machine and a path of a reflux current formed between the inverter and the windings of the AC rotating machine are blocked. Thus, even when control is continued by the normal system and the AC rotating machine rotates at a high speed, generation of regenerative brake torque by regenerative power generation and generation of motor brake torque by a reflux current flowing through the current path formed between the inverter and the windings of the AC rotating machine can be prevented, so that drive of the AC rotating machine by the normal system can be stably continued.

In other words, as for the control device for an AC rotating machine according to the first embodiment, by suppressing motor brake torque by a system in which an abnormality has occurred as much as possible in a control device that controls an AC rotating machine including windings of a plurality of systems, an abnormality occurring in a system can be prevented from interfering with control by a normal system. In addition, it is possible to provide a control device with high reliability in which control by a normal system can be stably continued.

Second Embodiment

Figure 4:
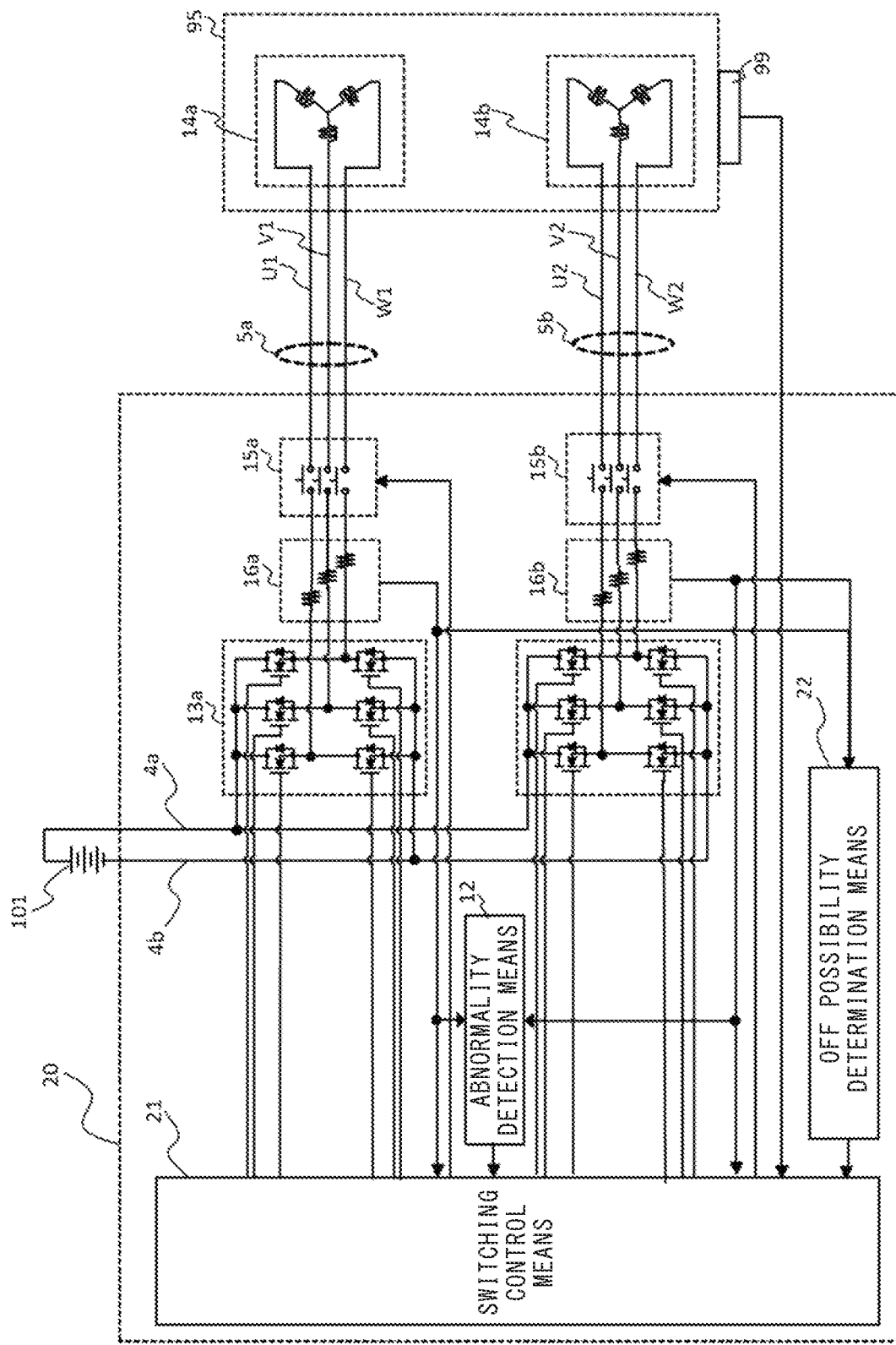
FIG. 4 is a schematic configuration diagram showing a control device for an AC rotating machine according to a second embodiment.

Next, a second embodiment will be described with reference to FIG. 4 and FIG. 5. FIG. 4 is a schematic configuration diagram showing a control device for an AC rotating machine according to the second embodiment. As shown in FIG. 4, a control device 20 for an AC rotating machine includes an inverter 13a of a first system, an inverter 13b of a second system, a motor relay 15a connected between the first winding system 14a and the inverter 13a of the first system, a motor relay 15b connected between the second winding system 14b and the inverter 13b of the second system, motor current detection means 16a and 16b for detecting values of currents of the AC rotating machine 95 which flow through the AC buses 5a and 5b, switching control means 21 for generating drive commands to switching elements of the inverters 13a and 13b, abnormality detection means 12 for detecting abnormalities in the control device 20 for an AC rotating machine and the AC rotating machine 95, and motor relay OFF possibility determination means 22 (shown as OFF possibility determination means 22 in FIG. 4) for determining whether it is possible to switch off the motor relays 15a and 15b. As described above, in the control device 20 for an AC rotating machine, the motor relay OFF possibility determination means 22 is added as compared to the control device 10 for an AC rotating machine according to the first embodiment. In addition, in this regard, a process of the switching control means 21 is partially different from the process of the switching control means 11 according to the first embodiment. Hereinafter, the differences from the first embodiment will be mainly described.

The current values of the AC rotating machine 95 detected by the motor current detection means 16a and 16b, that is, the phase current value of each phase, is inputted to the motor relay OFF possibility determination means 22. If the phase current values of all the phases (U1, V1, W1) of the first system are smaller than a predetermined current value, the motor relay OFF possibility determination means 22 determines that it is possible to switch off the motor relay 15a of the first system. If at least one or more of the phase current values of all the phases (U1, V1, W1) of the first system are equal to or larger than the predetermined current value, the motor relay OFF possibility determination means 22 determines that it is impossible to switch off the motor relay 15a of the first system. Also, for the motor relay 15b of the second system, the motor relay OFF possibility determination means 22 determines whether it is possible to switch off the motor relay 15b, on the basis of the phase current values of all the phases (U2, V2, W2) of the second system by the same method.

Owing to this configuration, a motor relay OFF operation in a state where a large current flows through the motor relay can be prevented, so that the motor relay can be prevented from being damaged, and a motor relay OFF operation can be performed only in a state where such a motor relay OFF operation can be reliably performed. It should be noted that the motor relay OFF possibility determination means 22 according to the second embodiment determines whether it is possible to switch off the motor relays 15a and 15b, by using the current values detected by the motor current detection means 16a and 16b. That is, current detection means for detection of an abnormality in each system and current detection means for motor relay OFF possibility determination are the same in the second embodiment, but current detection means for detection of an abnormality in each system and current detection means for motor relay OFF possibility determination may be individually provided. In addition, a hardware configuration that realizes the motor relay OFF possibility determination means 22 is the same as the example of the hardware configuration of the switching control means 11 and the abnormality detection means 12 shown in FIG. 2.

The switching control means 21 performs overall control of the control device 20 for an AC rotating machine, and includes a microcontroller (not shown) and a gate drive circuit for driving each switching element of the inverters 13a and 13b. A control method for the AC rotating machine in a normal state is the same as that of the switching control means 11 of the first embodiment. The difference from the switching control means 11 of the first embodiment is that, in addition to abnormality detection information from the abnormality detection means 12, a motor relay OFF possibility determination result is inputted from the motor relay OFF possibility determination means 22, and a drive command signal to each switching element and ON/OFF drive commands to the motor relays 15a and 15b in the case where an abnormality is detected are generated on the basis of these pieces of information. Detailed operation will be described later.

The abnormality detection means 12 is the same as that of the first embodiment and detects an abnormality in each system. For example, the abnormality detection means 12 detects short-circuit failures and open-circuit failures of the switching elements of the inverters 13a and 13b.

The technical feature of the control device 20 for an AC rotating machine according to the second embodiment is that the control device 20 includes inverters of a plurality of systems corresponding to windings of a plurality of systems and motor relays connected between the inverters and the AC rotating machine and further includes motor relay OFF possibility determination means for determining whether it is possible to turn off the motor relays, and that, when an abnormality in at least one system is detected by the abnormality detection means: in the inverter of the system in which the abnormality has been detected, if the motor relay OFF possibility determination means determines that it is possible to switch off the motor relay, the motor relay is turned off, and if the motor relay OFF possibility determination means determines that it is impossible to switch off the motor relay, the motor relay is kept on, the switching elements of all the phases on the positive electrode side (all the high-side switching elements) or the switching elements of all the phases on the negative electrode side (all the low-side switching elements) are turned on, and the switching elements of all the phases on the reverse potential side are turned off; and normal control is continued in the inverter of a normal system other than the system in which the abnormality has been detected.

Hereinafter, an operation of "turning on the switching elements of all the phases on the positive electrode side (all the high-side switching elements) or the switching elements of all the phases on the negative electrode side (all the low-side switching elements) and turning off the switching elements of all the phases on the reverse potential side with respect to the side on which the switching elements of all the phases are turned on" is referred to as a three-phase short-circuit process. In addition, as a more detailed description, an operation of "turning on all the high-side switching elements and turning off all the low-side switching elements" is referred to as a high-side three-phase short-circuit process, and an operation of "turning on all the low-side switching elements and turning off all the high-side switching elements" is referred to as a low side three-phase short-circuit process.

Next, operation will be described. FIG. 5 is a flowchart showing operation of the control device for an AC rotating machine according to the second embodiment. The process shown in the flowchart of FIG. 5 is described as a process of one sequence to be executed by software. In reality, the process shown in FIG. 5 is periodically and repeatedly executed according to the calculation cycle of the software.

Hereinafter, the case where a short-circuit failure of the high-side switching elements or an open-circuit failure of a low-side switching element of the inverter 13a or 13b is detected by the abnormality detection means 12 will be described as an example of an abnormality in each system.

First, whether there is no abnormality in the first system, that is, whether there is no abnormality, for example, in the inverter 13a of the first system, is determined on the basis of the detection result of the abnormality detection means 12 (step ST201). If there is no abnormality in the first system (step ST201: YES), the process shifts to step ST202, and whether there is no abnormality in the second system, that is, whether there is no abnormality, for example, in the inverter 13b of the second system, is determined on the basis of the detection result of the abnormality detection means 12 (step ST202). If there is no abnormality in the second system (step ST202: YES), the process shifts to step ST203. If there is an abnormality in the second system (step ST202: NO), the process shifts to step ST204.

When the process shifts to step ST203, since there is no abnormality in each of the inverter 13a of the first system and the inverter 13b of the second system, and there is no abnormality in each of the first system and the second system, the first system and the second system continue normal control. The switching control means 21 outputs an ON drive command to the motor relay 15a of the first system and the motor relay 15b of the second system, and also outputs a switching drive command calculated as usual on the basis of the phase current information and the rotation angle information, to each switching element of the inverter 13a of the first system and each switching element of the inverter 13b of the second system.

When the process shifts to ST204, there is no abnormality in the inverter 13a of the first system, and there is no abnormality in the first system. On the other hand, there is an abnormality in the inverter 13b of the second system, and there is an abnormality in the second system. In such a case, whereas the first system continues normal control, the second system is stopped such that brake torque is not generated, while preventing the motor relay 15b from being damaged. Specifically, the following operation is performed.

In step ST204, the motor relay OFF possibility determination means 22 determines whether it is possible to switch off the motor relay 15b of the second system. Specifically, as described above, the motor relay OFF possibility determination means 22 determines whether the phase current values of all the phases (U2, V2, W2) of the second system are smaller than a predetermined current value. If the phase current values of all the phases (U2, V2, W2) are smaller than the predetermined current value, the motor relay OFF possibility determination means 22 determines that it is possible to switch off the motor relay 15b of the second system. If at least one or more of the phase current values of all the phases (U2, V2, W2) of the second system are equal to or larger than the predetermined current value, the motor relay OFF possibility determination means 22 determines that it is impossible to switch off the motor relay 15b of the second system. If it is determined that it is possible to switch off the motor relay 15b of the second system (step ST204: YES), the process shifts to step ST205. If it is determined that it is impossible to switch off the motor relay 15b of the second system (step ST204: NO), the process shifts to step ST206.

When the process shifts to step ST205, there is no abnormality in the inverter 13a of the first system, and there is no abnormality in the first system. On the other hand, there is an abnormality in the inverter 13b of the second system, and there is an abnormality in the second system. Moreover, it is possible to switch off the motor relay 15b of the second system. In such a case, whereas the first system continues normal control, the second system is stopped such that brake torque is not generated. The switching control means 21 outputs an ON drive command to the motor relay 15a of the first system, and also outputs a switching drive command calculated as usual on the basis of the phase current information and the rotation angle information, to each switching element of the inverter 13a of the first system. In addition, the switching control means 21 outputs an OFF drive command to the motor relay 15b of the second system, and also outputs a switching drive command to each switching element of the inverter 13b of the second system such that all the switching elements are turned off. As a result of the process in step ST205, the motor relay 15b of the second system in which the abnormality has been detected is turned off, so that a current path of a current generated by regenerative power generation of the AC rotating machine 95 and a path of a reflux current formed between the inverter 13b and the second winding system 14b are blocked in the second system.

When the process shifts to step ST206, there is no abnormality in the inverter 13a of the first system, and there is no abnormality in the first system. On the other hand, there is an abnormality in the inverter 13b of the second system, and there is an abnormality in the second system. Moreover, it is impossible to switch off the motor relay 15b of the second system. In such a case, whereas the first system continues normal control, the second system is stopped while suppressing brake torque. The switching control means 21 outputs an ON drive command to the motor relay 15a of the first system, and also outputs a switching drive command calculated as usual on the basis of the phase current information and the rotation angle information, to each switching element of the inverter 13a of the first system. In addition, the switching control means 21 outputs an ON drive command to the motor relay 15b of the second system, and also performs the above-described three-phase short-circuit process on each switching element of the inverter 13b of the second system. Here, as an abnormality in the inverter 13b, a short-circuit failure of a high-side switching element or an open-circuit failure of a low-side switching element is considered, and thus the switching control means 21 outputs a switching drive command such that the high-side three-phase short-circuit process is performed. That is, the switching control means 21 outputs an ON command to all the high-side switching elements of the inverter 13b and outputs an OFF command to all the low-side switching elements of the inverter 13b.

Figure 5:
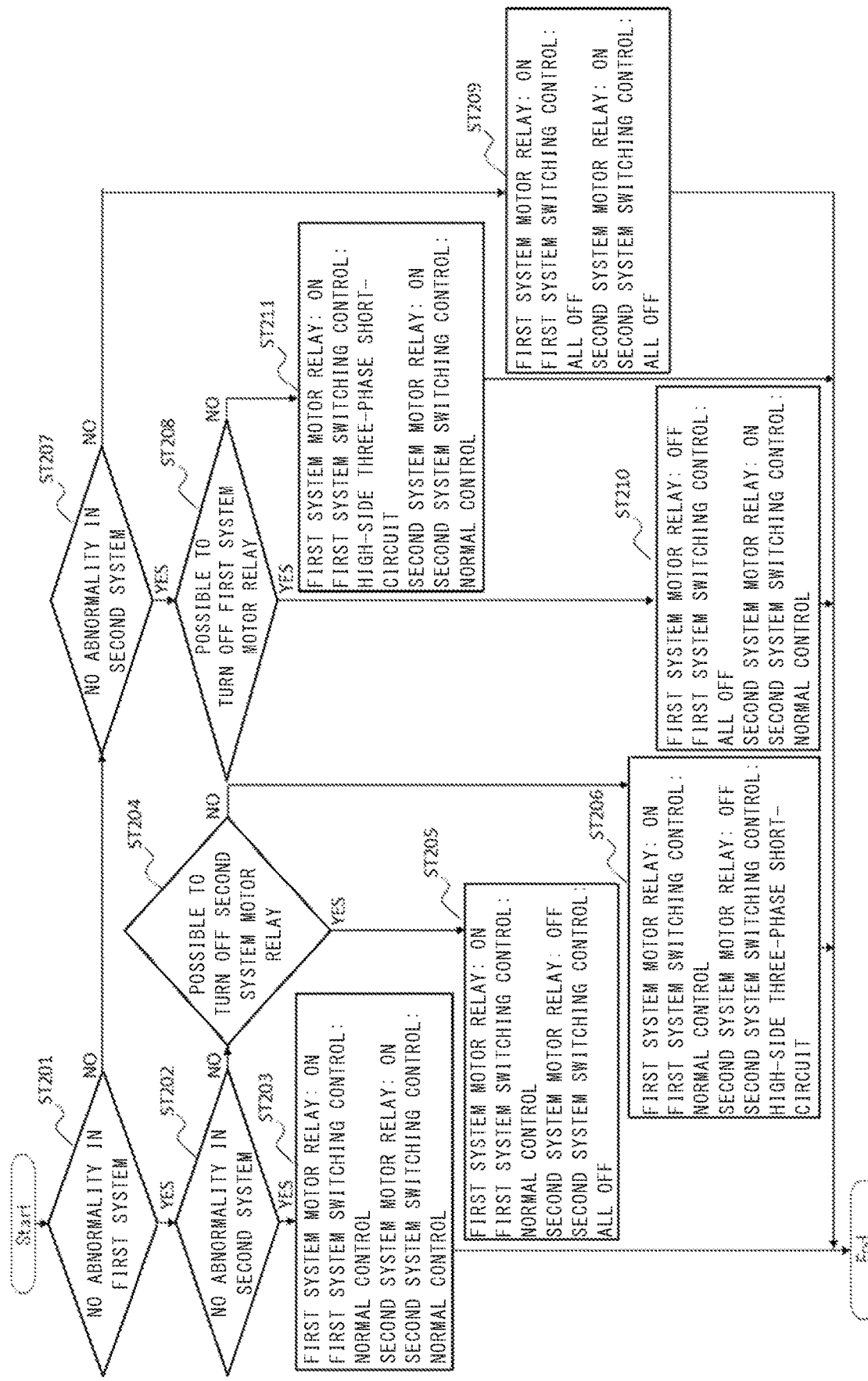
FIG. 5 is a flowchart showing operation of the control device for an AC rotating machine according to the second embodiment.

The process shown in FIG. 5 is periodically and repeatedly executed as described above, and in each cycle after the process in step ST206 is performed, the process basically shifts to step ST204 again unless the result of abnormality detection changes such that NO in step ST201 or YES in step ST202 is determined. In addition, this operation is repeatedly executed. That is, an operation of continuing the high-side three-phase short-circuit process on the second system in step ST206 until it is determined in step ST204 that it is possible to switch off the motor relay 15b of the second system and the motor relay 15b is finally turned off, is performed.

When it is determined that it is possible to switch off the motor relay 15b in the second system in which the abnormality has been detected, the motor relay 15b of the second system in which the abnormality has been detected is turned off, so that a current path of a current generated by regenerative power generation of the AC rotating machine 95 and a path of a reflux current formed between the inverter 13b and the second winding system 14b are blocked in the second system. Therefore, even when control is continued by the first system and the AC rotating machine 95 rotates, generation of regenerative brake torque by regenerative power generation and generation of brake torque by a reflux current flowing through the current path formed between the inverter and the windings of the AC rotating machine 95 can be prevented in the second system, so that drive of the AC rotating machine 95 by the first system can be stably continued. On the other hand, in the second system in which the abnormality has been detected, while it is determined that it is impossible to turn off the motor relay, the high-side three-phase short-circuit process is continued with the motor relay 15b kept on. Thus, the motor relay 15b can be prevented from being damaged. While the motor relay 15b is turned on, motor brake torque is generated by a reflux current flowing through the current path formed between the inverter 13b and the second winding system 14b, but regenerative brake torque by regenerative power generation of the AC rotating machine 95 can be prevented since the high side in the second system is brought into a three-phase short circuit state. That is, the influence of brake torque in the second system generated due to normal control by the first system is only the influence of motor brake torque by a reflux current flowing through a current path formed between the inverter and the windings, and can be relatively small. Moreover, when it is determined that it is possible to switch off the motor relay 15b in the second system, the motor relay 15b is switched off, and the motor brake torque by the reflux current is eliminated. Thus, generation of regenerative brake torque by regenerative power generation and generation of motor brake torque by a reflux current flowing through the current path formed between the inverter and the windings of the AC rotating machine 95 can be finally prevented in the second system, so that drive of the AC rotating machine 95 by the first system can be stably continued.

After the motor relay 15b is turned off in the second system, the path of a reflux current is blocked such that no current flows therethrough and the current detection values by the motor current detection means 16b in the second system become 0, so that the motor relay OFF possibility determination means 22 always determines that it is possible to turn off the motor relay 15b of the second system. That is, after the motor relay OFF possibility determination means 22 determines that it is possible to turn off the motor relay and the motor relay 15b is turned off, the off state of the motor relay 15b is continued.

If, in step ST201, there is an abnormality in the first system (step ST201: NO), the process shifts to step ST207, and whether there is no abnormality in the second system, that is, whether there is no abnormality, for example, in the inverter 13b of the second system, is determined on the basis of the detection result of the abnormality detection means 12 (step ST207). If there is no abnormality in the second system in (step ST207: YES), the process shifts to step ST208. If there is an abnormality in the second system (step ST207: NO), the process shifts to step ST209.

When the process shifts to step ST208, there is no abnormality in the inverter 13b of the second system, and there is no abnormality in the second system. On the other hand, there is an abnormality in the inverter 13a of the first system, and there is an abnormality in the first system. In such a case, whereas the second system continues normal control, the first system is stopped such that brake torque is not generated, while preventing the motor relay 15a from being damaged. Specifically, the following operation is performed. Operations in step ST208, step ST210, and step ST211 described later are no more than operations obtained by interchanging the operations of the first system and the second system in the operations in step ST204, step ST205, and step ST206 described above, are performed.

In step ST208, the motor relay OFF possibility determination means 22 determines whether it is possible to switch off the motor relay 15a of the first system. Specifically, as described above, the motor relay OFF possibility determination means 22 determines whether the phase current values of all the phases (U1, V1, W1) of the first system are smaller than a predetermined current value. If the phase current values of all the phases (U1, V1, W1) are smaller than the predetermined current value, the motor relay OFF possibility determination means 22 determines that it is possible to switch off the motor relay 15a of the first system. If at least one or more of the phase current values of all the phases (U1, V1, W1) of the first system are equal to or larger than the predetermined current value, the motor relay OFF possibility determination means 22 determines that it is impossible to switch off the motor relay 15a of the first system. If it is determined that it is possible to switch off the motor relay 15a of the first system (step ST208: YES), the process shifts to step ST210. If it is determined that it is impossible to switch off the motor relay 15a of the first system (step ST208: NO), the process shifts to step ST211.

When the process shifts to step ST210, there is no abnormality in the inverter 13b of the second system, and there is no abnormality in the second system. On the other hand, there is an abnormality in the inverter 13a of the first system, and there is an abnormality in the first system. Moreover, it is possible to switch off the motor relay 15a of the first system. In such a case, whereas the second system continues normal control, the first system is stopped such that brake torque is not generated. The switching control means 21 outputs an ON drive command to the motor relay 15b of the second system, and also outputs a switching drive command calculated as usual on the basis of the phase current information and the rotation angle information, to each switching element of the inverter 13b of the second system. In addition, the switching control means 21 outputs an OFF drive command to the motor relay 15a of the first system, and also outputs a switching drive command to each switching element of the inverter 13a of the first system such that all the switching elements are turned off. As a result of the process in step ST210, the motor relay 15a of the first system in which the abnormality has been detected is turned off, so that a current path of a current generated by regenerative power generation of the AC rotating machine 95 and a path of a reflux current formed between the inverter 13a and the first winding system 14a are blocked in the first system.

When the process shifts to step ST211, there is no abnormality in the inverter 13b of the second system, and there is no abnormality in the second system. On the other hand, there is an abnormality in the inverter 13a of the first system, and there is an abnormality in the first system. Moreover, it is impossible to switch off the motor relay 15a of the first system. In such a case, whereas the second system continues normal control, the first system is stopped while suppressing brake torque. The switching control means 21 outputs an ON drive command to the motor relay 15b of the second system, and also outputs a switching drive command calculated as usual on the basis of the phase current information and the rotation angle information, to each switching element of the inverter 13b of the second system. In addition, the switching control means 21 outputs an ON drive command to the motor relay 15a of the first system, and also performs the above-described three-phase short-circuit process on each switching element of the inverter 13a of the first system. Here, as an abnormality in the inverter 13a, a short-circuit failure of a high-side switching element or an open-circuit failure of a low-side switching element is considered, and thus the switching control means 21 outputs a switching drive command such that the high-side three-phase short-circuit process is performed. That is, the switching control means 21 outputs an ON command to all the high-side switching elements of the inverter 13a and outputs an OFF command to all the low-side switching elements of the inverter 13a.

The process shown in FIG. 5 is periodically and repeatedly executed as described above, and in the process in the next cycle after the process in step ST211 is performed, the process basically shifts to step ST208 again unless the result of abnormality detection changes such that YES in step ST201 or NO in step ST207 is determined. In addition, this operation is repeatedly executed. That is, an operation of continuing the high-side three-phase short-circuit process on the first system in step ST211 until it is determined in step ST208 that it is possible to switch off the motor relay 15a of the first system and the motor relay 15a is finally turned off, is performed.

When it is determined that it is possible to switch off the motor relay 15a in the first system in which the abnormality has been detected, the motor relay 15a of the first system in which the abnormality has been detected is turned off, so that a current path of a current generated by regenerative power generation of the AC rotating machine 95 and a path of a reflux current formed between the inverter 13a and the first winding system 14a are blocked in the first system. Therefore, even when control is continued by the second system and the AC rotating machine 95 rotates, generation of regenerative brake torque by regenerative power generation and generation of brake torque by a reflux current flowing through the current path formed between the inverter and the windings of the AC rotating machine 95 can be prevented in the first system, so that drive of the AC rotating machine 95 by the second system can be stably continued. On the other hand, in the first system in which the abnormality has been detected, when it is determined that it is impossible to turn off the motor relay, the high-side three-phase short-circuit process is continued with the motor relay 15a kept on. Thus, the motor relay 15a can be prevented from being damaged. While the motor relay 15a is turned on, motor brake torque is generated by a reflux current flowing through the current path formed between the inverter 13a and the first winding system 14a, but regenerative brake torque by regenerative power generation of the AC rotating machine 95 can be prevented since the high side in the first system is brought into a three-phase short circuit state. That is, the influence of brake torque in the first system generated due to normal control by the second system is only the influence of motor brake torque by a reflux current flowing through a current path formed between the inverter and the windings, and can be relatively small. Moreover, when it is determined that it is possible to switch off the motor relay 15a in the first system, the motor relay 15a is switched off, and the motor brake torque by the reflux current is eliminated. Thus, generation of regenerative brake torque by regenerative power generation and generation of motor brake torque by a reflux current flowing through the current path formed between the inverter and the windings of the AC rotating machine 95 can be finally prevented in the first system, so that drive of the AC rotating machine 95 by the second system can be stably continued.

After the motor relay 15a is turned off in the first system, the path of a reflux current is blocked such that no current flows therethrough and the current detection values by the motor current detection means 16a in the first system become 0, so that the motor relay OFF possibility determination means 22 always determines that it is possible to turn off the motor relay 15a of the first system. That is, after the motor relay OFF possibility determination means 22 determines that it is possible to switch off the motor relay and the motor relay 15a is turned off, the off state of the motor relay 15a is continued.

When the process shifts to step ST209, since there is an abnormality in each of the inverter 13a of the first system and the inverter 13b of the second system, and there is an abnormality in each of the first system and the second system, both the first system and the second system stop control of the AC rotating machine 95. The switching control means 21 outputs an ON drive command to the motor relay 15a of the first system and the motor relay 15b of the second system, and also outputs a switching drive command to each switching element of the inverter 13a of the first system and the inverter 13b of the second system such that all the switching elements are turned off.

The reason why the operation of outputting an ON drive command to the motor relay 15a of the first system and the motor relay 15b of the second system is performed in step ST209 is to ensure a current path of a current generated by regenerative power generation of the AC rotating machine 95. Owing to the presence of the current path, a current generated by regenerative power generation flows to the power supply 101. Thus, even if the AC rotating machine 95 rotates at a high speed when it is determined that there is an abnormality in each of the first system and the second system, the time taken until the rotation of the AC rotating machine 95 stops can be shortened by regenerative brake torque generated by regenerative power generation. On the other hand, in a system in which it is not necessary to immediately stop rotation of the AC rotating machine 95, an operation of outputting an OFF drive command to the motor relay 15a of the first system and the motor relay 15b of the second system may be performed.

In step ST205, the operation of outputting an OFF drive command to the motor relay 15b of the second system and outputting a switching drive command to each switching element of the inverter 13b of the second system such that all the switching elements are turned off, is performed. However, the main purpose of the operation in step ST205 is to output an OFF drive command to the motor relay 15b of the second system, it is not always necessary to turn off all the switching elements of the inverter 13b of the second system, and it is sufficient if the high-side switching elements and the low-side switching elements are not turned on at the same time. Thus, for example, an operation of outputting a drive command for turning on either the high-side switching elements or the low-side switching elements as a command to each switching element of the inverter 13b of the second system may be performed. Even in this case, the motor relay 15b is similarly turned off, so that a reflux current does not flow between the inverter 13b and the second winding system 14b, and the same effects as those in the case where all the switching elements of the inverter 13b are turned off can be obtained.

Also, as for the process in step ST210, that is, the operation of outputting an OFF drive command to the motor relay 15a of the first system and outputting a switching drive command to the inverter 13a of the first system such that all the switching elements are turned off, the description is the same as the above description for step ST205, it is not always necessary to turn off all the switching elements of the inverter 13a of the first system, and it is sufficient if the high-side switching elements and the low-side switching elements are not turned on at the same time. Therefore, for example, an operation of outputting a drive command for turning on either the high-side switching elements or the low-side switching elements as a command to the inverter 13a of the first system may be performed. Even in this case, the motor relay 15a is similarly turned off, so that a reflux current does not flow between the inverter 13a and the first winding system 14a, and the same effects as those in the case where all the switching elements of the inverter 13a are turned off can be obtained.

In the second embodiment, in step ST206 and step ST211, the high-side three-phase short-circuit process is performed on each switching element of the inverter 13b of the second system and each switching element of the inverter 13a of the first system. This is because the description of operation is given with the case where a short-circuit failure of a high-side switching element or an open-circuit failure of a low-side switching element is detected by the abnormality detection means 12, as an example. When a short-circuit failure of a low-side switching element or an open-circuit failure of a high-side switching element is detected by the abnormality detection means 12, the low-side three-phase short-circuit process is performed in step ST206 and step ST211. That is, the three-phase short-circuit process in the case where the motor relay cannot be turned off in a system in which there is an abnormality is performed on the side where a switching element in which a short-circuit failure has occurred is present, or on the switching elements on the opposite side from the switching element in which an open-circuit failure has occurred.

As described above, as for the control device for an AC rotating machine according to the second embodiment, the control device for an AC rotating machine which controls an AC rotating machine including windings of a plurality of systems has a configuration in which, when an abnormality is detected in at least the inverter of one system: in the inverter of the system in which the abnormality has been detected, the motor relay is turned off if the motor relay OFF possibility determination means determines that it is possible to switch off a motor relay, and if the motor relay OFF possibility determination means determines that it is impossible to switch off the motor relay, the three-phase short-circuit process is performed on the switching elements of the inverter with the motor relay kept on; and normal control is continued in the inverter of a normal system other than the system in which the abnormality has been detected.

Owing to this configuration, in the system in which the abnormality has been detected, if it is determined that it is possible to switch off the motor relay, a path of a current generated by regenerative power generation of the AC rotating machine and a path of a reflux current formed between the inverter and the windings of the AC rotating machine are blocked. Thus, even when control is continued by the normal system and the AC rotating machine rotates at a high speed, generation of regenerative brake torque by regenerative power generation and generation of motor brake torque by a reflux current flowing through the current path formed between the inverter and the windings of the AC rotating machine can be prevented, so that drive of the AC rotating machine by the normal system can be stably continued. On the other hand, in the system in which the abnormality has been detected, if it is determined that it is impossible to switch off the motor relay, the three-phase short-circuit process is continued with the motor relay kept on. Thus, the motor relay can be prevented from being damaged. In this case as well, since the abnormal system is brought into a three-phase short-circuit state, power generation brake torque by regenerative power generation of the AC rotating machine can be prevented. Thus, the influence of the brake torque by the abnormal system on normal control by the normal system is only the influence of brake torque by a reflux current flowing through a current path formed between the inverter and the windings, and can be relatively small. In addition, while control by the normal system is continued, when rotation of the AC rotating machine is controlled to be reduced, more typically, when control is performed such that the rotation is stopped, the reflux current in the abnormal system becomes smaller, so that it is determined that it is possible to switch off the motor relay of the abnormal system, and the motor relay is turned off. Thus, generation of regenerative brake torque by regenerative power generation and generation of brake torque by a reflux current flowing through the current path formed between the inverter and the windings of the AC rotating machine can be finally prevented, so that drive of the AC rotating machine by the normal system can be stably continued.

In other words, as for the control device for an AC rotating machine according to the second embodiment, by suppressing brake torque in a system in which an abnormality has occurred as much as possible in a control device that controls an AC rotating machine including windings of a plurality of systems, it is possible to provide a control device with high reliability in which control by a normal system can be stably continued.

In an electric braking device for a vehicle to which the control device for an AC rotating machine according to the present disclosure is applied, basically, a braking operation (brake operation) is not performed permanently, and a situation where a driver does not step on the brake occurs quite naturally. In such a situation, the rotation of the AC rotating machine is often stopped, and the currents flowing through the windings of the AC rotating machine also often approach zero. In the second embodiment, the motor relay is intentionally turned on depending on the currents flowing through the windings of the AC rotating machine, and motor brake torque by a reflux current is allowed. However, since the process is repeated according to the calculation cycle of the software, and the currents flowing through the windings of the AC rotating machine also often approach zero as described above, the time when the motor relay is turned on in the system in which an abnormality has been detected is often short. From the above viewpoint, in the second embodiment, the motor relay OFF possibility determination means is provided, and, if it is determined that it is possible to switch off the motor relay of the system in which an abnormality has been detected, the motor relay is turned off, and if it is determined that it is impossible to switch off the motor relay, the three-phase short-circuit process is performed as a temporary process with the motor relay turned on, whereby both improvement of efficiency by suppressing brake torque when an abnormality occurs and improvement of reliability by preventing the motor relay from being damaged are achieved.

Third Embodiment

Figure 6:
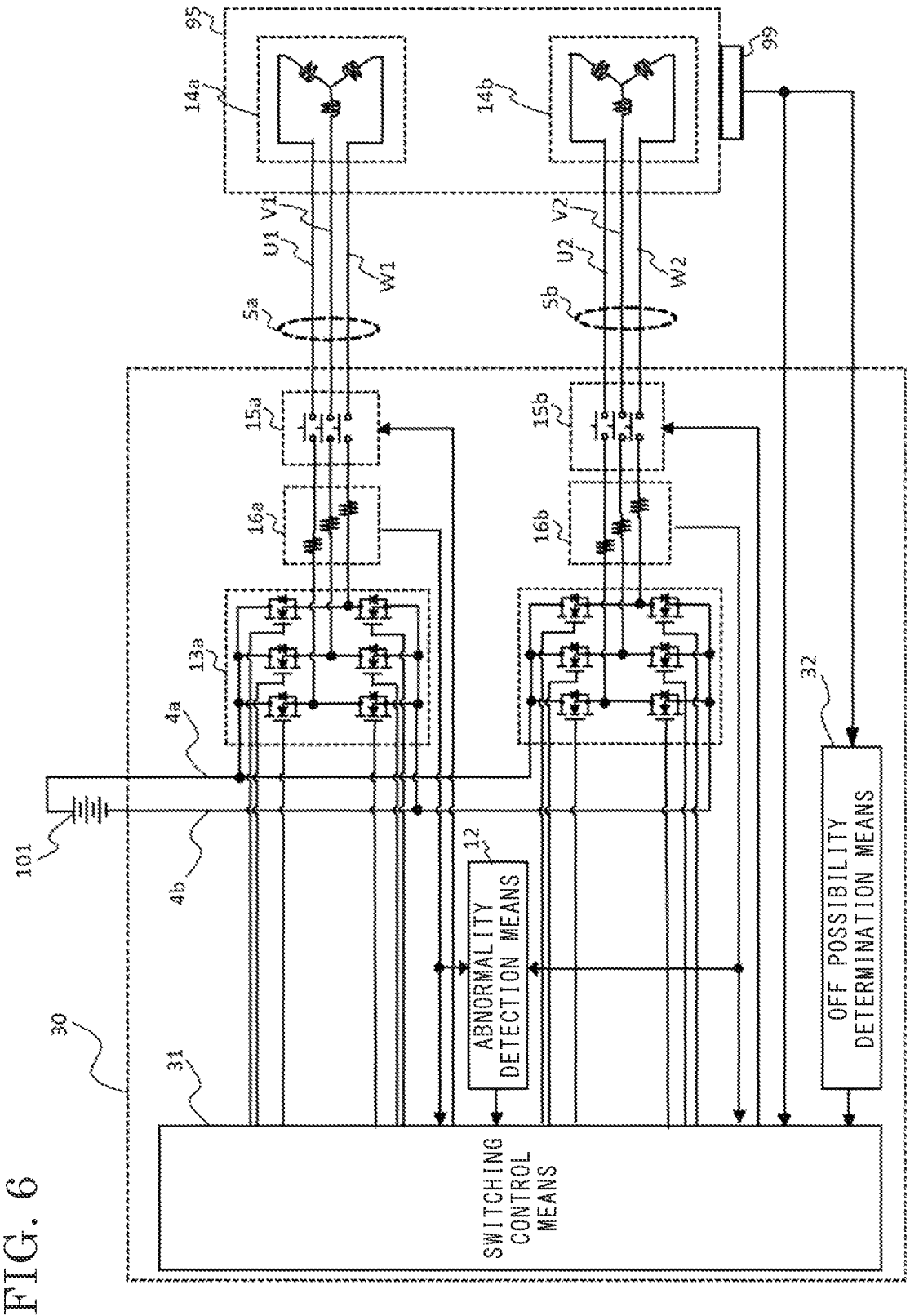
FIG. 6 is a schematic configuration diagram showing a control device for an AC rotating machine according to a third embodiment.

Next, a third embodiment will be described with reference to FIG. 6 and FIG. 7. FIG. 6 is a schematic configuration diagram showing a control device for an AC rotating machine according to the third embodiment. As shown in FIG. 6, a control device 30 for an AC rotating machine includes an inverter 13a of a first system, an inverter 13b of a second system, a motor relay 15a connected between the first winding system 14a and the inverter 13a of the first system, a motor relay 15b connected between the second winding system 14b and the inverter 13b of the second system, motor current detection means 16a and 16b for detecting values of currents of the AC rotating machine 95 which flow through the AC buses 5a and 5b, switching control means 31 for generating drive commands to switching elements of the inverters 13a and 13b, abnormality detection means 12 for detecting abnormalities in the control device 30 for an AC rotating machine and the AC rotating machine 95, and motor relay OFF possibility determination means 32 (shown as OFF possibility determination means 32 in FIG. 6) for determining whether it is possible to switch off the motor relays 15a and 15b. The control device 30 for an AC rotating machine is different from the control device 20 for an AC rotating machine according to the second embodiment, in information inputted to the motor relay OFF possibility determination means 32. In addition, in this regard, a process of the switching control means 31 is partially different from the process of the switching control means 21 according to the second embodiment. Hereinafter, the differences from the second embodiment will be mainly described.

Rotation angle information of the AC rotating machine 95 is inputted to the motor relay OFF possibility determination means 32 by the rotation angle sensor 99, and the motor relay OFF possibility determination means 32 calculates a rotation speed of the AC rotating machine 95 on the basis of the inputted rotation angle information. If the rotation speed of the AC rotating machine 95 is equal to or lower than a predetermined rotation speed, the motor relay OFF possibility determination means 32 determines that it is possible to switch off the motor relays 15a and 15b. If the rotation speed of the AC rotating machine 95 is higher than the predetermined rotation speed, the motor relay OFF possibility determination means 32 determines that it is impossible to switch off the motor relays 15a and 15b. Owing to this configuration, a motor relay OFF operation in a state where the AC rotating machine 95 rotates at a high speed can be prevented. More specifically, in a state where the rotation speed of the AC rotating machine 95 is high when the switching elements of the inverters 13a and 13b are in a three-phase short-circuit state or are in an all switched-off state, a reflux current flowing through a current path formed between the inverter 13a and the first winding system 14a or between the inverter 13b and the second winding system 14b and a regenerative current by regenerative power generation of the AC rotating machine 95 are large. That is, the state where the rotation speed of the AC rotating machine 95 is higher than the predetermined rotation speed is also a state where the currents flowing through the motor relays 15a and 15b are large. By providing the motor relay OFF possibility determination means 32, a motor relay OFF operation in such a state can be prevented, so that each motor relay can be prevented from being damaged, and a motor relay OFF operation can be performed only in a state where such a motor relay OFF operation can be reliably performed.

The switching control means 31 records and updates ON/OFF drive command signals outputted to the motor relays 15a and 15b, in a RAM or the like in a process in each calculation cycle of software. The motor relay OFF possibility determination means 32 determines whether the ON/OFF drive command signals outputted to the motor relays 15a and 15b in the previous calculation process are OFF drive command signals, by referring to the RAM or the like in which the previous ON/OFF drive command signals are stored, thereby determining whether the motor relays 15a and 15b have already been turned off.

The switching control means 31 performs overall control of the control device 30 for an AC rotating machine, and includes a microcontroller (not shown) and a gate drive circuit for driving each switching element of the inverters 13a and 13b. A control method for the AC rotating machine in a normal state is the same as that of the switching control means 21 of the second embodiment. The difference from the switching control means 21 of the second embodiment is a process related to a difference in the method for motor relay OFF possibility determination, and is that a drive command signal to each switching element and ON/OFF drive command signals to the motor relays 15a and 15b in the case where an abnormality is detected are generated. Detailed operation will be described later.

The technical feature of the control device 30 for an AC rotating machine according to the third embodiment is that the control device 30 includes inverters of a plurality of systems corresponding to windings of a plurality of systems and motor relays connected between the inverters and the AC rotating machine and further includes motor relay OFF possibility determination means for determining whether it is possible to turn off the motor relays, and that, when an abnormality in at least one system is detected by the abnormality detection means: in the inverter of the system in which the abnormality has been detected, if the motor relay OFF possibility determination means determines that it is possible to switch off the motor relay, the motor relay is turned off, and if the motor relay OFF possibility determination means determines that it is impossible to switch off the motor relay, the motor relay is kept on, and all the switching elements of the inverter are turned off; and normal control is continued in the inverter of a normal system other than the system in which the abnormality has been detected.

Next, operation will be described. FIG. 7 is a flowchart showing operation of the control device for an AC rotating machine according to the third embodiment. The process shown in the flowchart of FIG. 7 is described as a process of one sequence to be executed by software. In reality, the process shown in FIG. 7 is periodically and repeatedly executed according to the calculation cycle of the software.

Hereinafter, the case where an abnormality in the gate drive circuit for driving each switching element of the inverters 13a and 13b (abnormality that causes a state where the switching elements cannot be turned on) is detected by the abnormality detection means 12 will be described as an example of an abnormality in each system.

First, whether there is no abnormality in the first system, that is, whether there is no abnormality, for example, in the inverter 13a of the first system, is determined on the basis of the detection result of the abnormality detection means 12 (step ST301). If there is no abnormality in the first system (step ST301: YES), the process shifts to step ST302, and whether there is no abnormality in the second system, that is, whether there is no abnormality, for example, in the inverter 13b of the second system, is determined on the basis of the detection result of the abnormality detection means 12 (step ST302). If there is no abnormality in the second system (step ST302: YES), the process shifts to step ST303. If there is an abnormality in the second system (step ST302: NO), the process shifts to step ST304.

When the process shifts to step ST303, since there is no abnormality in each of the inverter 13a of the first system and the inverter 13b of the second system, and there is no abnormality in each of the first system and the second system, the first system and the second system continue normal control. The switching control means 31 outputs an ON drive command to the motor relay 15a of the first system and the motor relay 15b of the second system, and also outputs a switching drive command calculated as usual on the basis of the phase current information and the rotation angle information, to each switching element of the inverter 13a of the first system and each switching element of the inverter 13b of the second system.

When the process shifts to ST304, there is no abnormality in the inverter 13a of the first system, and there is no abnormality in the first system. On the other hand, there is an abnormality in the inverter 13b of the second system, and there is an abnormality in the second system. In such a case, whereas the first system continues normal control, the second system is stopped such that brake torque is not generated, while preventing the motor relay 15b from being damaged. Specifically, the following operation is performed.

In step ST304, the motor relay OFF possibility determination means 32 determines whether the motor relay 15b of the second system has already been turned off. If the motor relay 15b of the second system has not been turned off, the motor relay OFF possibility determination means 32 determines whether it is possible to switch off the motor relay 15b. Specifically, as described above, the motor relay OFF possibility determination means 32 calculates a rotation speed of the AC rotating machine 95 from the rotation angle information of the AC rotating machine 95 inputted from the rotation angle sensor 99, and determines whether the rotation speed of the AC rotating machine 95 is equal to or lower than a predetermined rotation speed. If the rotation speed of the AC rotating machine 95 is equal to or lower than the predetermined rotation speed, the motor relay OFF possibility determination means 32 determines that it is possible to switch off the motor relay 15b. If the rotation speed of the AC rotating machine 95 is higher than the predetermined rotation speed, the motor relay OFF possibility determination means 32 determines that it is impossible to switch off the motor relay 15b. If it is determined that the motor relay 15b of the second system has already been turned off or it is possible to switch off the motor relay 15b (step ST304: YES), the process shifts to step ST305. If it is determined that it is impossible to switch off the motor relay 15b of the second system (step ST304: NO), the process shifts to step ST306.

When the process shifts to step ST305, there is no abnormality in the inverter 13a of the first system, and there is no abnormality in the first system. On the other hand, there is an abnormality in the inverter 13b of the second system, and there is an abnormality in the second system. Moreover, the motor relay 15b of the second system has already been turned off, or it is possible to switch off the motor relay 15b. In such a case, whereas the first system continues normal control, the second system is stopped such that brake torque is not generated. The switching control means 31 outputs an ON drive command to the motor relay 15a of the first system, and also outputs a switching drive command calculated as usual on the basis of the phase current information and the rotation angle information, to each switching element of the inverter 13a of the first system. In addition, the switching control means 31 outputs an OFF drive command to the motor relay 15b of the second system, and also outputs a switching drive command to each switching element of the inverter 13b of the second system such that all the switching elements are turned off. As a result of the process in step ST305, the motor relay 15b of the second system in which the abnormality has been detected is turned off, so that a current path of a current generated by regenerative power generation of the AC rotating machine 95 and a path of a reflux current formed between the inverter 13b and the second winding system 14b are blocked in the second system.

When the process shifts to step ST306, there is no abnormality in the inverter 13a of the first system, and there is no abnormality in the first system. On the other hand, there is an abnormality in the inverter 13b of the second system, and there is an abnormality in the second system. Moreover, it is impossible to switch off the motor relay 15b of the second system. In addition, as described above, an abnormality that causes a state where the switching elements cannot be turned on has occurred in the inverter 13b, so that the three-phase short-circuit process as in the second embodiment cannot be performed. In such a case, the switching control means 31 outputs an ON drive command to the motor relay 15a of the first system, and also outputs a switching drive command calculated as usual on the basis of the phase current information and the rotation angle information, to each switching element of the inverter 13a of the first system. In addition, the switching control means 31 outputs an ON drive command to the motor relay 15b of the second system, and also outputs an OFF command to all the switching elements of the inverter 13b of the second system.

Figure 7:
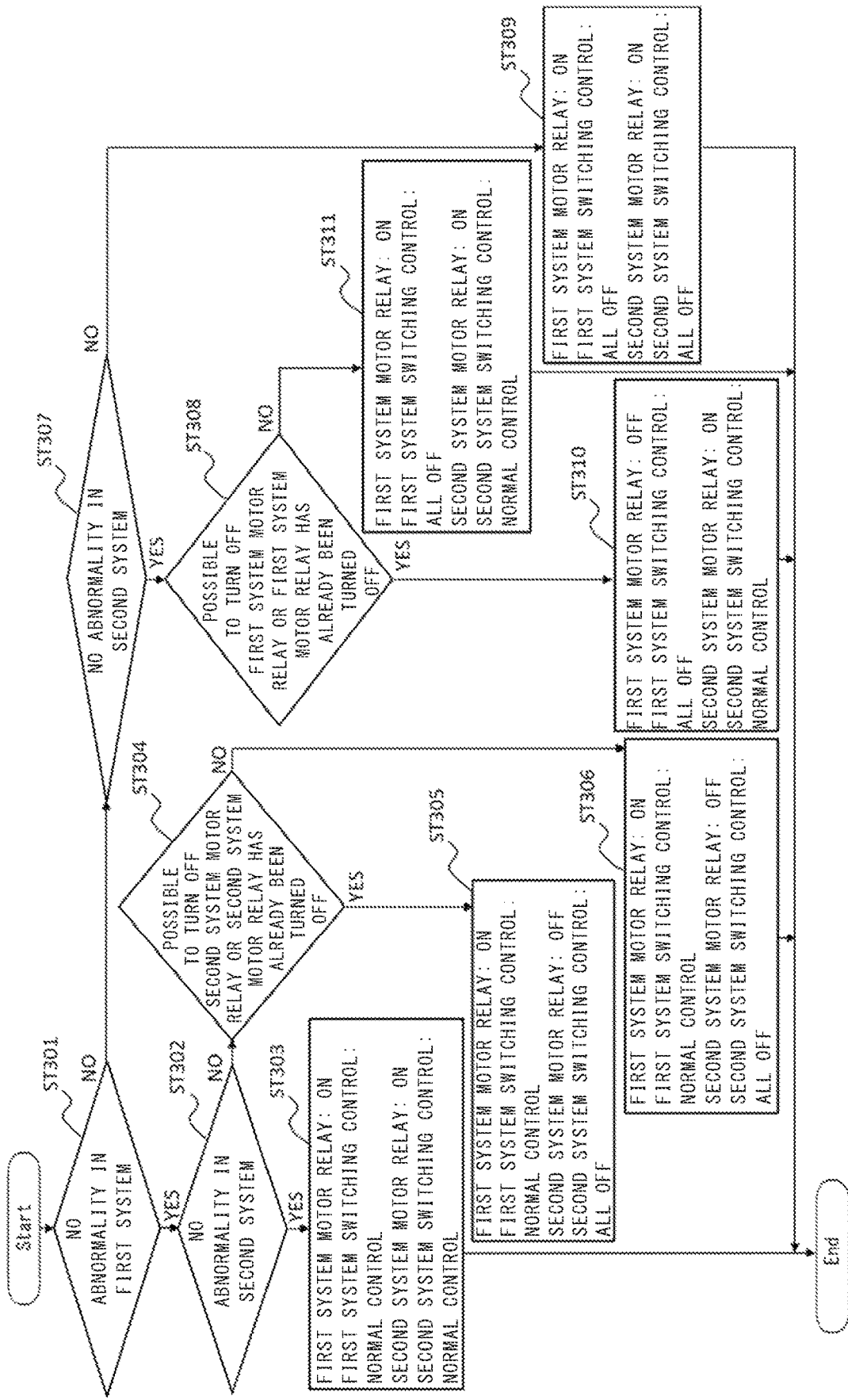
FIG. 7 is a flowchart showing operation of the control device for an AC rotating machine according to the third embodiment.

The process shown in FIG. 7 is periodically and repeatedly executed as described above, and in each cycle after the process in step ST306 is performed, the process basically shifts to step ST304 again unless the result of abnormality detection changes such that NO in step ST301 or YES in step ST302 is determined. In addition, this operation is repeatedly executed. That is, a process of turning off all the switching elements of the inverter 13b of the second system in step ST306 is continued until it is determined in step ST304 that it is possible to switch off the motor relay 15b of the second system and the motor relay 15b is finally turned off.

When it is determined that it is possible to switch off the motor relay 15b in the second system in which the abnormality has been detected, the motor relay 15b is turned off, so that a current path of a current generated by regenerative power generation of the AC rotating machine 95 and a path of a reflux current formed between the inverter 13b and the second winding system 14b are blocked in the second system. Therefore, even when control is continued by the first system and the AC rotating machine 95 rotates, generation of regenerative brake torque by regenerative power generation and generation of brake torque by a reflux current flowing through the current path formed between the inverter and the windings of the AC rotating machine 95 can be prevented in the second system, so that drive of the AC rotating machine 95 by the first system can be stably continued. On the other hand, in the second system in which the abnormality has been detected, if it is determined that it is impossible to switch off the motor relay 15b, the process of turning off all the switching elements of the inverter 13b is continued with the motor relay 15b kept on. Thus, the motor relay 15b can be prevented from being damaged. While the motor relay 15b is turned on, motor brake torque is generated by a reflux current flowing through the current path formed between the inverter 13b and the second winding system 14b, and regenerative brake torque is generated by regenerative power generation of the AC rotating machine 95. However, in the second system, the motor relay 15b is switched off when it is determined that it is possible to switch off the motor relay 15b, the regenerative brake torque and the motor brake torque are eliminated, and this state is maintained. Thus, generation of regenerative brake torque by regenerative power generation and generation of motor brake torque by a reflux current flowing through the current path formed between the inverter and the windings of the AC rotating machine 95 can be finally prevented in the second system, so that drive of the AC rotating machine 95 by the first system can be stably continued.

If, in step ST301, there is an abnormality in the first system (step ST301: NO), the process shifts to step ST307, and whether there is no abnormality in the second system, that is, whether there is no abnormality, for example, in the inverter 13b of the second system, is determined on the basis of the detection result of the abnormality detection means 12 (step ST307). If there is no abnormality in the second system in (step ST307: YES), the process shifts to step ST308. If there is an abnormality in the second system (step ST307: NO), the process shifts to step ST309.

When the process shifts to step ST308, there is no abnormality in the inverter 13b of the second system, and there is no abnormality in the second system. On the other hand, there is an abnormality in the inverter 13a of the first system, and there is an abnormality in the first system. In such a case, whereas the second system continues normal control, the first system is stopped such that brake torque is not generated, while preventing the motor relay 15a from being damaged. Specifically, the following operation is performed. Operations in step ST308, step ST310, and step ST311 described later are no more than operations obtained by interchanging the operations of the first system and the second system in the operations in step ST304, step ST305, and step ST306 described above, are performed.

In step ST308, the motor relay OFF possibility determination means 32 determines whether the motor relay 15a of the first system has already been turned off. If the motor relay 15a has not been turned off, the motor relay OFF possibility determination means 32 determines whether it is possible to switch off the motor relay 15a. Specifically, as described above, the motor relay OFF possibility determination means 32 calculates a rotation speed of the AC rotating machine 95 from the rotation angle information of the AC rotating machine 95 inputted from the rotation angle sensor 99, and determines whether the rotation speed of the AC rotating machine 95 is equal to or lower than a predetermined rotation speed. If the rotation speed of the AC rotating machine 95 is equal to or lower than the predetermined rotation speed, the motor relay OFF possibility determination means 32 determines that it is possible to switch off the motor relay 15a. If the rotation speed of the AC rotating machine 95 is higher than the predetermined rotation speed, the motor relay OFF possibility determination means 32 determines that it is impossible to switch off the motor relay 15a. If it is determined that the motor relay 15a of the first system has already been turned off or it is possible to switch off the motor relay 15a (step ST308: YES), the process shifts to step ST310. If it is determined that it is impossible to switch off the motor relay 15a of the first system (step ST308: NO), the process shifts to step ST311.

When the process shifts to step ST310, there is no abnormality in the inverter 13b of the second system, and there is no abnormality in the second system. On the other hand, there is an abnormality in the inverter 13a of the first system, and there is an abnormality in the first system. Moreover, the motor relay 15a of the first system has already been turned off, or it is possible to switch off the motor relay 15a. In such a case, whereas the second system continues normal control, the first system is stopped such that brake torque is not generated. The switching control means 31 outputs an ON drive command to the motor relay 15b of the second system, and also outputs a switching drive command calculated as usual on the basis of the phase current information and the rotation angle information, to each switching element of the inverter 13b of the second system. In addition, the switching control means 31 outputs an OFF drive command to the motor relay 15a of the first system, and also outputs a switching drive command to each switching element of the inverter 13a of the first system such that all the switching elements are turned off. As a result of the process in step ST310, the motor relay 15a of the first system in which the abnormality has been detected is turned off, so that a current path of a current generated by regenerative power generation of the AC rotating machine 95 and a path of a reflux current formed between the inverter 13a and the first winding system 14a are blocked in the first system.

When the process shifts to step ST311, there is no abnormality in the inverter 13*b* of the second system, and there is no abnormality in the second system. On the other hand, there is an abnormality in the inverter 13*a* of the first system, and there is an abnormality in the first system. Moreover, it is impossible to switch off the motor relay 15*a* of the first system. In addition, as described above, an abnormality that causes a state where the switching elements cannot be turned on has occurred in the inverter 13*a*, so that the three-phase short-circuit process as in the second embodiment cannot be performed. In such a case, the switching control means 31 outputs an ON drive command to the motor relay 15*b* of the second system, and also outputs a switching drive command calculated as usual on the basis of the phase current information and the rotation angle information, to each switching element of the inverter 13*b* of the second system. In addition, the switching control means 31 outputs an ON drive command to the motor relay 15*a* of the first system, and also outputs an OFF command to all the switching elements of the inverter 13*a* of the first system.

The process shown in FIG. 7 is periodically and repeatedly executed as described above, and in each cycle after the process in step ST311 is performed, the process basically shifts to step ST308 again unless the result of abnormality detection changes such that YES in step ST301 or NO in step ST307 is determined. In addition, this operation is repeatedly executed. That is, a process of turning off all the switching elements of the inverter 13*a* of the first system in step ST311 is continued until it is determined in step ST308 that it is possible to switch off the motor relay 15*a* of the first system and the motor relay 15*a* is finally turned off.

When it is determined that it is possible to switch off the motor relay 15*a* in the first system in which the abnormality has been detected, the motor relay 15*a* is turned off, so that a current path of a current generated by regenerative power generation of the AC rotating machine 95 and a path of a reflux current formed between the inverter 13*a* and the first winding system 14*a* are blocked in the first system. Therefore, even when control is continued by the second system and the AC rotating machine 95 rotates, generation of regenerative brake torque by regenerative power generation and generation of brake torque by a reflux current flowing through the current path formed between the inverter and the windings of the AC rotating machine 95 can be prevented in the first system, so that drive of the AC rotating machine 95 by the second system can be stably continued. On the other hand, in the first system in which the abnormality has been detected, if it is determined that it is impossible to switch off the motor relay 15*a*, the process of turning off all the switching elements of the inverter 13*a* is continued with the motor relay 15*a* kept on. Thus, the motor relay 15*a* can be prevented from being damaged. While the motor relay 15*a* is turned on, motor brake torque is generated by a reflux current flowing through the current path formed between the inverter 13*a* and the first winding system 14*a*, and regenerative brake torque is generated by regenerative power generation of the AC rotating machine 95. However, in the first system, the motor relay 15*a* is switched off when it is determined that it is possible to switch off the motor relay 15*a*, the regenerative brake torque and the motor brake torque are eliminated, and this state is maintained. Thus, generation of regenerative brake torque by regenerative power generation and generation of motor brake torque by a reflux current flowing through the current path formed between the inverter and the windings of the AC rotating machine 95 can be finally prevented in the first system, so that drive of the AC rotating machine 95 by the second system can be stably continued.

When the process shifts to step ST309, since there is an abnormality in each of the inverter 13*a* of the first system and the inverter 13*b* of the second system, and there is an abnormality in each of the first system and the second system, both the first system and the second system stop control of the AC rotating machine 95. The switching control means 31 outputs an ON drive command to the motor relay 15*a* of the first system and the motor relay 15*b* of the second system, and also outputs a switching drive command to each switching element of the inverter 13*a* of the first system and the inverter 13*b* of the second system such that all the switching elements are turned off.

The reason why the operation of outputting an ON drive command to the motor relay 15*a* of the first system and the motor relay 15*b* of the second system is performed in step ST309 is to ensure a current path of a current generated by regenerative power generation of the AC rotating machine 95. Owing to the presence of the current path, a current generated by regenerative power generation flows to the power supply 101. Thus, even if the AC rotating machine 95 rotates at a high speed when it is determined that there is an abnormality in each of the first system and the second system, the time taken until the rotation of the AC rotating machine 95 stops can be shortened by regenerative brake torque generated by regenerative power generation. On the other hand, in a system in which it is not necessary to immediately stop rotation of the AC rotating machine 95, an operation of outputting an OFF drive command to the motor relay 15*a* of the first system and the motor relay 15*b* of the second system may be performed.

As described above, as for the control device for an AC rotating machine according to the third embodiment, the control device for an AC rotating machine which controls an AC rotating machine including windings of a plurality of systems has a configuration in which, when an abnormality is detected in at least the inverter of one system: in the inverter of the system in which the abnormality has been detected, the motor relay is turned off if the motor relay OFF possibility determination means determines that it is possible to switch off a motor relay, and if the motor relay OFF possibility determination means determines that it is impossible to switch off the motor relay, all the switching elements of the inverter are turned off with the motor relay kept on; and normal control is continued in the inverter of a normal system other than the system in which the abnormality has been detected.

Owing to this configuration, in the system in which the abnormality has been detected, if it is determined that it is possible to switch off the motor relay, a path of a current generated by regenerative power generation of the AC rotating machine and a path of a reflux current formed between the inverter and the windings of the AC rotating machine are blocked. Thus, even when control is continued by the normal system and the AC rotating machine rotates at a high speed, generation of regenerative brake torque by regenerative power generation and generation of motor brake torque by a reflux current flowing through the current path formed between the inverter and the windings of the AC rotating machine can be prevented in the system in which the abnormality has been detected, so that drive of the AC rotating machine by the normal system can be stably continued. On the other hand, in the system in which the abnormality has been detected, if it is determined that it is impossible to switch off the motor relay, the all switching-off process is continued with the motor relay kept on. Thus, the motor relay can be prevented from being damaged. In this case, since the abnormal system is brought into an all switched-off state, regenerative brake torque is generated by regenerative power generation of the AC rotating machine. However, while control by the normal system is continued, when rotation of the AC rotating machine is controlled to be reduced, more typically, when control is performed such that the rotation is stopped, it is determined that it is possible to switch off the motor relay of the abnormal system, and the motor relay is turned off. In addition, an operation of keeping the motor relay off after the motor relay is turned off in the system in which the abnormality has been detected is performed. Thus, generation of regenerative brake torque by regenerative power generation and generation of motor brake torque by a reflux current flowing through the current path formed between the inverter and the windings of the AC rotating machine can be finally prevented, so that drive of the AC rotating machine by the normal system can be stably continued.

In other words, as for the control device for an AC rotating machine according to the third embodiment, by suppressing brake torque in a system in which an abnormality has occurred as much as possible in a control device that controls an AC rotating machine including windings of a plurality of systems, it is possible to provide a control device with high reliability in which control by a normal system can be stably continued.

Although the example in which the number of systems of the AC rotating machine is two has been described in the first to third embodiments, the number of systems of the AC rotating machine is not particularly limited thereto, and may be three or more.

Fourth Embodiment

Figure 8:
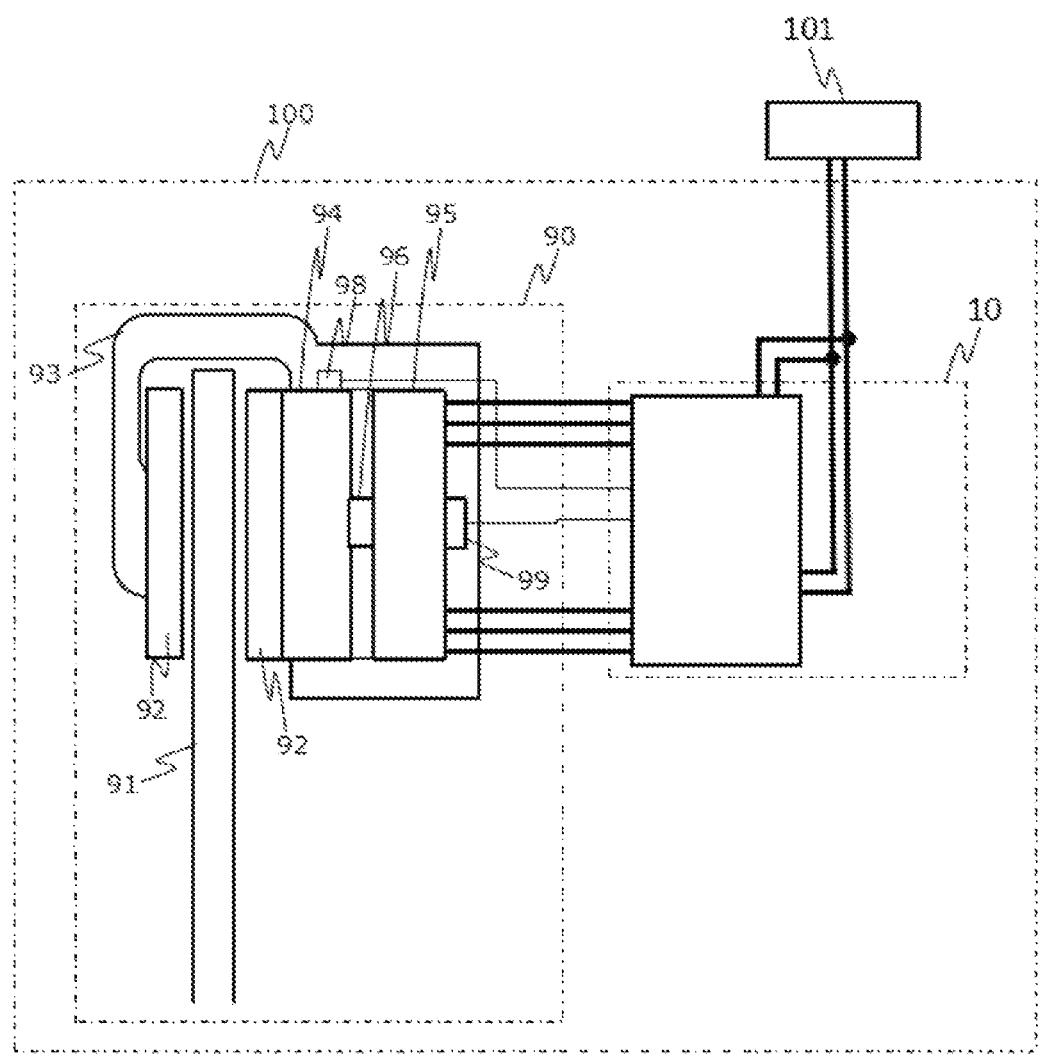
FIG. 8 is a schematic configuration diagram showing an electric braking device for a vehicle according to a fourth embodiment.

A fourth embodiment will be described with reference to FIG. 8. The fourth embodiment relates to an electric braking device for a vehicle in which any of the control devices for an AC rotating machine according to the first to third embodiments is used. FIG. 8 is a schematic configuration diagram showing an electric braking device for a vehicle according to the fourth embodiment. FIG. 8 shows the case where the control device 10 for an AC rotating machine according to the first embodiment is used. However, the control device 10 for an AC rotating machine in FIG. 8 may be replaced with the control device 20 for an AC rotating machine according to the second embodiment or the control device 30 for an AC rotating machine according to the third embodiment. An electric braking device 100 for a vehicle includes the control device 10 for an AC rotating machine and a brake mechanism 90. The brake mechanism 90 includes: the AC rotating machine 95 which is driven by power supplied from the power supply 101 and which is controlled by the control device 10 for an AC rotating machine; a disc rotor 91, that is, a rotating member, which is fixed to a wheel (not shown) of a vehicle and rotates together with the wheel; and brake pads 92, that is, friction members, which are incorporated in a caliper 93. In the brake mechanism 90, the disc rotor 91 is pressed from both sides by the brake pads 92 to generate braking torque with respect to the wheel. A piston 94 as a pressing structure is fixed to the brake pad 92, and a drive shaft 96 of the AC rotating machine 95 is provided to the piston 94. Accordingly, torque (braking torque) of the AC rotating machine 95 is transmitted to the brake pad 92 via the drive shaft 96 and the piston 94. A load sensor 98 is provided to the piston 94.

Under the above configuration, the electric braking device 100 for a vehicle controls the brake mechanism 90 via the AC rotating machine 95 by frequently repeating rotation and stop of the AC rotating machine 95 in accordance with ON/OFF of the braking of the vehicle. That is, in the electric braking device 100 for a vehicle, there are frequently timings at which it is possible to switch off the motor relays of the control device 10 for an AC rotating machine. From this, at the moment when an abnormality is detected in either the control device 10 for an AC rotating machine or the AC rotating machine 95, even if the motor relay cannot be turned off, a state where it is possible to switch off the motor relay is obtained in a relatively short time. The electric braking device 100 for a vehicle according to the fourth embodiment is one of the devices that can particularly enjoy the effects of each of the control devices for an AC rotating machine according to the first to third embodiments, and suppresses the brake torque in the system in which an abnormality has occurred as much as possible, whereby control by a normal system can be stably continued and high reliability can be realized.

Although the present disclosure is described above in terms of exemplary embodiments, it should be understood that the various features, aspects, and functionality described in the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated.

For example, motor relay OFF possibility determination based on current values as in the second embodiment may be applied to the third embodiment, or motor relay OFF possibility determination based on the rotation speed of the AC rotating machine as in the third embodiment may be applied to the second embodiment.

DESCRIPTION OF THE REFERENCE CHARACTERS 10, 20, 30 control device for an AC rotating machine
11, 21, 31 switching control means
13a, 13b inverter
14a first winding system
14b second winding system
15a, 15b motor relay
16a, 16b motor current detection means
22, 32 motor relay OFF possibility determination means
91 disc rotor
92 brake pad
95 AC rotating machine
99 rotation angle sensor
100 electric braking device for vehicle

What is claimed is:

1. A control device for an AC rotating machine, for controlling an AC rotating machine including windings of a plurality of systems, the control device comprising:
   a plurality of inverters for controlling voltages to be applied to the windings of the systems, respectively;
   a plurality of switches for switching between connection and blocking of a circuit between the windings and the inverter in each of the systems;
   a processor for executing a program; and a storage device in which the program is stored, wherein
the following operation is performed by the program
executed by the processor,
controlling the plurality of inverters and the plurality of switches;
detecting an abnormality in each of the systems, wherein
when an abnormality has been detected in at least one of the systems, the processor causes the switches to block the circuit between the windings and the inverter in the system in which the abnormality has been detected, and continues normal control in a system other than the system in which the abnormality has been detected,
wherein the program executed by the processor further determines whether it is possible to block the circuit between the windings and the inverter by the switches, wherein
the program executed by the processor detects an abnormality in each of the systems by detecting whether an abnormality has occurred in any switching element of the inverter for each of the systems, and
when it is determined that it is impossible to block the circuit between the windings and the inverter by the switches in the system in which the abnormality has been detected, the program executed by the processor turns on all switching elements on a positive electrode side of the inverter for the system in which the abnormality has been detected and turns off all switching elements on a negative electrode side of said inverter, or turns off all the switching elements on the positive electrode side and turns on all the switching elements on the negative electrode side, with the circuit kept connected between the windings and the inverter in the system in which the abnormality has been detected.

2. A control device for an AC rotating machine, for controlling an AC rotating machine including windings of a plurality of systems, the control device comprising:
a plurality of inverters for controlling voltages to be applied to the windings of the systems, respectively;
a plurality of switches for switching between connection and blocking of a circuit between the windings and the inverter in each of the systems;
a processor for executing a program; and
a storage device in which the program is stored, wherein
the following operation is performed by the program executed by the processor,
controlling the plurality of inverters and the plurality of switches;
detecting an abnormality in each of the systems, wherein
when an abnormality has been detected in at least one of the systems, the processor causes the switches to block the circuit between the windings and the inverter in the system in which the abnormality has been detected, and continues normal control in a system other than the system in which the abnormality has been detected, wherein
the program executed by the processor further determines whether it is possible to block the circuit between the windings and the inverter by the switches, wherein
when it is determined that it is impossible to block the circuit between the windings and the inverter by the switches in the system in which the abnormality has been detected, the program executed by the processor turns off all switching elements of the inverter for the system in which the abnormality has been detected, with the circuit kept connected between the windings and the inverter in the system in which the abnormality has been detected.

3. The control device for an AC rotating machine according to claim 1, further comprising a plurality of current detector for detecting current values of currents flowing through the windings in the systems, respectively, wherein
if the current values of the currents flowing through the windings are smaller than a predetermined current value, the program executed by the processor determines that it is possible to block the circuit between the windings and the inverter, and if the current value of the current flowing through the winding is equal to or higher than the predetermined current value, the program executed by the processor determines that it is impossible to block the circuit between the windings and the inverter.

4. The control device for an AC rotating machine according to claim 1, further comprising a rotation angle sensor for detecting a rotation angle of the AC rotating machine, wherein
the program executed by the processor calculates a rotation speed from the rotation angle of the AC rotating machine, determines that it is possible to block the circuit between the windings and the inverter if the rotation speed is equal to or lower than a predetermined rotation speed, and determines that it is impossible to block the circuit between the windings and the inverter if the rotation speed is higher than the predetermined rotation speed.

5. The control device for an AC rotating machine according to claim 2, further comprising a plurality of current detector for detecting current values of currents flowing through the windings in the systems, respectively, wherein
if the current values of the currents flowing through the windings are smaller than a predetermined current value, the program executed by the processor determines that it is possible to block the circuit between the windings and the inverter, and if the current value of the current flowing through the winding is equal to or higher than the predetermined current value, the program executed by the processor determines that it is impossible to block the circuit between the windings and the inverter.

6. The control device for an AC rotating machine according to claim 2, further comprising a rotation angle sensor for detecting a rotation angle of the AC rotating machine, wherein
the program executed by the processor calculates a rotation speed from the rotation angle of the AC rotating machine, determines that it is possible to block the circuit between the windings and the inverter if the rotation speed is equal to or lower than a predetermined rotation speed, and determines that it is impossible to block the circuit between the windings and the inverter if the rotation speed is higher than the predetermined rotation speed.

7. The control device for an AC rotating machine according to claim 1, wherein, after it is determined that it is possible to block the circuit between the windings and the inverter by the switches in the system in which the abnormality has been detected, and the blocking is performed, the program executed by the processor maintains the blocking of the circuit between the windings and the inverter in the system in which the abnormality has been detected.

8. The control device for an AC rotating machine according to claim 2, wherein, after it is determined that it is possible to block the circuit between the windings and the inverter by the switches in the system in which the abnormality has been detected, and the blocking is performed, the program executed by the processor maintains the blocking of the circuit between the windings and the inverter in the system in which the abnormality has been detected.

9. The control device for an AC rotating machine according to claim 3, wherein, after it is determined that it is possible to block the circuit between the windings and the inverter by the switches in the system in which the abnormality has been detected, and the blocking is performed, the program executed by the processor maintains the blocking of the circuit between the windings and the inverter in the system in which the abnormality has been detected.

10. The control device for an AC rotating machine according to claim 4, wherein, after it is determined that it is possible to block the circuit between the windings and the inverter by the switches in the system in which the abnormality has been detected, and the blocking is performed, the program executed by the processor maintains the blocking of the circuit between the windings and the inverter in the system in which the abnormality has been detected.

11. The control device for an AC rotating machine according to claim 5, wherein, after it is determined that it is possible to block the circuit between the windings and the inverter by the switches in the system in which the abnormality has been detected, and the blocking is performed, the program executed by the processor maintains the blocking of the circuit between the windings and the inverter in the system in which the abnormality has been detected.

12. The control device for an AC rotating machine according to claim 6, wherein, after it is determined that it is possible to block the circuit between the windings and the inverter by the switches in the system in which the abnormality has been detected, and the blocking is performed, the program executed by the processor maintains the blocking of the circuit between the windings and the inverter in the system in which the abnormality has been detected.

13. The control device for an AC rotating machine according to claim 1, further comprising a plurality of second current detector for detecting current values of currents flowing through the windings in the systems, respectively, wherein
the program executed by the processor detects an abnormality in each of the systems on the basis of the current values detected by the plurality of second current detector.

14. The control device for an AC rotating machine according to claim 2, further comprising a plurality of second current detector for detecting current values of currents flowing through the windings in the systems, respectively, wherein
the program executed by the processor detects an abnormality in each of the systems on the basis of the current values detected by the plurality of second current detector.

15. The control device for an AC rotating machine according to claim 3, further comprising a plurality of second current detector for detecting current values of currents flowing through the windings in the systems, respectively, wherein
the program executed by the processor detects an abnormality in each of the systems on the basis of the current values detected by the plurality of second current detector.

16. The control device for an AC rotating machine according to claim 5, further comprising a plurality of second current detector for detecting current values of currents flowing through the windings in the systems, respectively, wherein
the program executed by the processor detects an abnormality in each of the systems on the basis of the current values detected by the plurality of second current detector.

17. An electric braking device for a vehicle, comprising:
the control device for an AC rotating machine according to claim 1;
an AC rotating machine controlled by the control device for an AC rotating machine;
a rotating member fixed to a wheel of a vehicle; and
a friction member which is connected to a drive shaft of the AC rotating machine, to which torque of the AC rotating machine is transmitted, and which is pressed against the rotating member to generate braking torque with respect to the rotating member.

18. A control method for an AC rotating machine including windings of a plurality of systems, the control method comprising the steps of:
detecting an abnormality in each system; and
if an abnormality is detected in at least one of the systems, blocking a circuit between the windings and an inverter for controlling voltages to be applied to the windings, in the system in which the abnormality has been detected, and continuing normal control in a system other than the system in which the abnormality has been detected,
wherein the control method further comprises the steps of:
determining whether it is possible to block the circuit between the windings and the inverter by the switches;
detecting an abnormality in each of the systems by detecting whether an abnormality has occurred in any switching element of the inverter for each of the systems, and
when it is determined that it is impossible to block the circuit between the windings and the inverter by the switches in the system in which the abnormality has been detected, turning on all switching elements on a positive electrode side of the inverter for the system in which the abnormality has been detected and turning off all switching elements on a negative electrode side of said inverter, or turning off all the switching elements on the positive electrode side and turning on all the switching elements on the negative electrode side, with the circuit kept connected between the windings and the inverter in the system in which the abnormality has been detected.

* * * * *